US012777196B2

(12) United States Patent
Li et al.

(10) Patent No.: US 12,777,196 B2
(45) Date of Patent: Oct. 27, 2026

(54) GEOMETRIC TRANSFORM IN NEURAL NETWORK-BASED CODING TOOLS FOR VIDEO CODING

(71) Applicant: Bytedance Inc., Los Angeles, CA (US)

(72) Inventors: Yue Li, San Diego, CA (US); Kai Zhang, San Diego, CA (US); Li Zhang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 19/010,466

(22) Filed: Jan. 6, 2025

(65) Prior Publication Data

US 2025/0142130 A1 May 1, 2025

Related U.S. Application Data

(63) Continuation of application No. PCT/US2023/027011, filed on Jul. 6, 2023.

(60) Provisional application No. 63/358,745, filed on Jul. 6, 2022.

(51) Int. Cl.
*H04N 19/85* (2014.01)
*H04N 19/176* (2014.01)
*H04N 19/186* (2014.01)
*H04N 19/70* (2014.01)

(52) U.S. Cl.
CPC ........... *H04N 19/85* (2014.11); *H04N 19/176* (2014.11); *H04N 19/186* (2014.11); *H04N 19/70* (2014.11)

(58) Field of Classification Search
CPC ............................. H04N 19/85; H04N 19/176
See application file for complete search history.

(56) References Cited

U.S. PATENT DOCUMENTS

2005/0185937 A1* 8/2005 Comer ........... H04N 21/234327 386/334
2016/0249062 A1 8/2016 Zhou et al.
2020/0304804 A1* 9/2020 Habibian ............. G06N 3/0464
2021/0150769 A1 5/2021 Babaheidarian

OTHER PUBLICATIONS

International Search Report from PCT Application No. PCT/US2023/027011 dated Oct. 11, 2023, 8 pages.

* cited by examiner

*Primary Examiner* — Jerry T Jean Baptiste
(74) *Attorney, Agent, or Firm* — Conley Rose, P.C.

(57) ABSTRACT

A mechanism for processing video data is disclosed. The mechanism determines to modify a video unit attendant to applying a video compression function. The modification may include applying a geometric conversion to the video unit. A conversion is performed between a visual media data and a bitstream based on the modified video unit.

19 Claims, 13 Drawing Sheets

(a) CTBs crossing the bottom picture border (b) CTBs crossing the right picture border (c) CTBs crossing the right bottom picture border

| | | | | | | | |
|---|---|---|---|---|---|---|---|
| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |
| $p3_4$ | $p2_4$ | $p1_4$ | $p0_4$ | $q0_4$ | $q1_4$ | $q2_4$ | $q3_4$ |
| $p3_5$ | $p2_5$ | $p1_5$ | $p0_5$ | $q0_5$ | $q1_5$ | $q2_5$ | $q3_5$ |
| $p3_6$ | $p2_6$ | $p1_6$ | $p0_6$ | $q0_6$ | $q1_6$ | $q2_6$ | $q3_6$ |
| $p3_7$ | $p2_7$ | $p1_7$ | $p0_7$ | $q0_7$ | $q1_7$ | $q2_7$ | $q3_7$ |

GEOMETRIC TRANSFORM IN NEURAL NETWORK-BASED CODING TOOLS FOR VIDEO CODING

CROSS-REFERENCE TO RELATED APPLICATION

This application is a continuation of International Patent Application No. PCT/US2023/027011, filed on Jul. 6, 2023, which claims the priority to and benefits of U.S. Provisional Patent Application No. 63/358,745, filed on Jul. 6, 2022. All the aforementioned patent applications are hereby incorporated by reference in their entireties.

TECHNICAL FIELD

The present disclosure relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data comprising: determining to modify a video unit attendant to applying a video compression function; and performing a conversion between a visual media data and a bitstream based on the modified video unit.

A second aspect relates to an apparatus for processing video data comprising: a processor; and a non-transitory memory with instructions thereon, wherein the instructions upon execution by the processor, cause the processor to perform any of the preceding aspects.

A third aspect relates to a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A fourth aspect relates to a non-transitory computer-readable recording medium storing a bitstream of a video which is generated by a method performed by a video processing apparatus, wherein the method comprises: determining to modify a video unit attendant to applying a video compression function; and generating the bitstream based on the determining.

A fifth aspect relates to a method for storing bitstream of a video comprising: determining to modify a video unit attendant to applying a video compression function; generating the bitstream based on the determining; and storing the bitstream in a non-transitory computer-readable recording medium.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
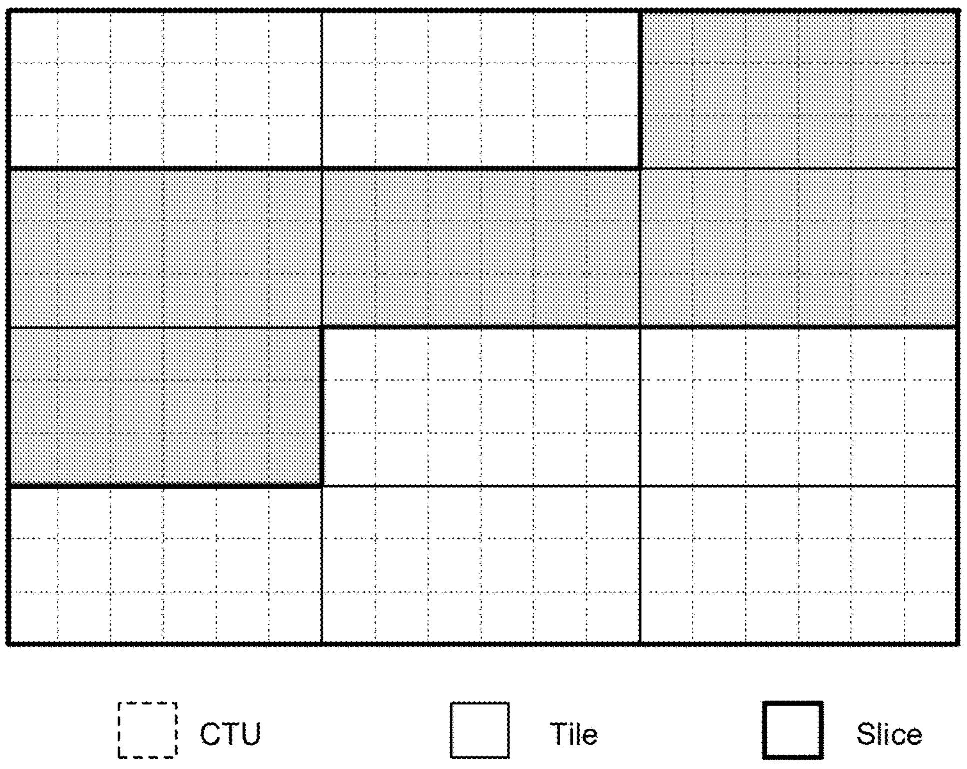
FIG. 1 illustrates an example picture partitioned into raster scan slices.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Section headings are used in the present document for ease of understanding and do not limit the applicability of techniques and embodiments disclosed in each section only to that section. Furthermore, the techniques described herein are applicable to other video codec protocols and designs.

1. Initial Discussion

This document is related to video coding technologies. Specifically, it is related to in-loop filter in image and/or video coding. The ideas may be applied individually or in various combinations to video codecs, such as High Efficiency Video Coding (HEVC), Versatile Video Coding (VVC), Audio Video Standard (AVC) version three (AVCs) or other video coding technologies. It may also be applicable to other video coding standards or video codecs or be used as post-processing method which is outside of the encoding and/or decoding process.

2. Video Coding Standards

Video coding standards have evolved primarily through the development of the International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly. Many methods have been adopted by JVET and put into the reference software named Joint Exploration Model (JEM). The JVET was created between VCEG and ISO/IEC Joint Telecommunication Commission (JTC1) Subcommittee (SC)29/Working Group (WG)11 (MPEG) to work on the VVC standard targeting a 50% bitrate reduction compared to HEVC.

2.1 Color Space and Chroma Subsampling

Color space, also known as the color model (or color system), is a mathematical model which describes the range of colors as tuples of numbers, for example as 3 or 4 values or color components (e.g., RGB). Generally speaking, a color space is an elaboration of the coordinate system and sub-space. For video compression, the most frequently used color spaces are luma, blue difference chroma, and red difference chroma (YCbCr) and red, green, blue (RGB).

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 4:4:4

In 4:4:4, each of the three Y'CbCr components have the same sample rate. Thus there is no chroma subsampling. This scheme is sometimes used in high-end film scanners and cinematic post production.

2.1.2 4:2:2

In 4:3:2, the two chroma components are sampled at half the sample rate of luma. The horizontal chroma resolution is halved. This reduces the bandwidth of an uncompressed video signal by one-third with little to no visual difference.

2.1.3 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting. In MPEG-2, Cb and Cr are cosited horizontally. Cb and Cr are sited between pixels in the vertical direction (sited interstitially). In JPEG/JPEG File Interchange Format (JFIF), H.261, and MPEG-1, Cb and Cr are sited interstitially, halfway between alternate luma samples. In 4:2:0 DV, Cb and Cr are co-sited in the horizontal direction. In the vertical direction, they are co-sited on alternating lines.

2.2 Definitions of Video Units

A picture is divided into one or more tile rows and one or more tile columns. A tile is a sequence of coding tree units (CTUs) that covers a rectangular region of a picture. A tile may be divided into one or more bricks, each of which includes a number of CTU rows within the tile. A tile that is not partitioned into multiple bricks may also be referred to as a brick. However, a brick that is a true subset of a tile may not be referred to as a tile. A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice. FIG. 1 shows an example of raster-scan slice partitioning of a picture with 18 by 12 luma CTUs, where the picture is divided into 12 tiles and 3 raster-scan slices.

Figure 2:
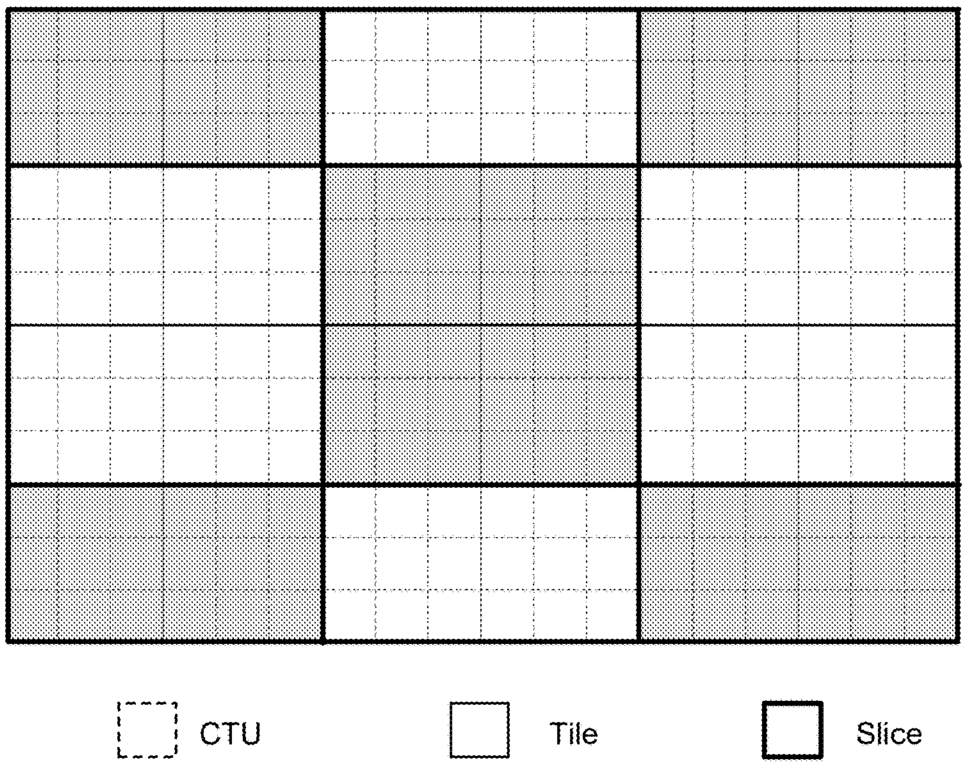
FIG. 2 illustrates an example picture partitioned into rectangular scan slices.

FIG. 2 shows an example of rectangular slice partitioning of a picture with 18 by 12 luma CTUs, where the picture is divided into 24 tiles (6 tile columns and 4 tile rows) and 9 rectangular slices.

Figure 3:
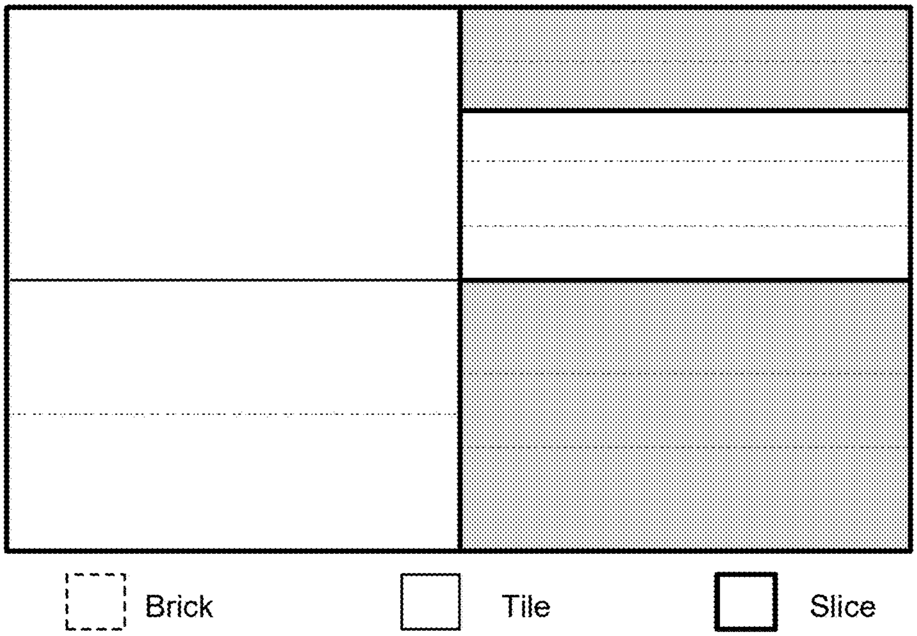
FIG. 3 illustrates an example picture partitioned into tiled.

FIG. 3 shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

2.2.1 CTU/CTB Sizes

In VVC, the CTU size, signaled in a sequence parameter set (SPS) by the syntax element log2_ctu_size_minus2, could be as small as 4×4.

7.3.2.3 Sequence Parameter Set RBSP Syntax

| | Descriptor |
|---|---|
| seq_parameter_set_rbsp( ) { | |
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 ); | |
| i <= sps_max_sub_layers_minus1; i++ ) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| long_term_ref_pics_flag | u(1) |
| sps_idr_rpl_present_flag | u(1) |
| rpl1_same_as_rpl0_flag | u(1) |
| for( i= 0; i < !rpl1_same_as_rpl0_flag ? 2 : 1; i++ ) { | |
| num_ref_pic_lists_in_sps[ i ] | ue(v) |
| for( j = 0; j < num_ref_pic_lists_in_sps[ i ]; j++) | |
| ref_pic_list_struct( i, j ) | |
| } | |
| qtbtt_dual_tree_intra_flag | u(1) |
| log2_ctu_size_minus2 | ue(v) |
| log2_min_luma_coding_block_size_minus2 | ue(v) |
| partition_constraints_override_enabled_flag | u(1) |
| sps_log2_diff_min_qt_min_cb_intra_slice_luma | ue(v) |
| sps_log2_diff_min_qt_min_cb_inter_slice | ue(v) |
| sps_max_mtt_hierarchy_depth_inter_slice | ue(v) |
| sps_max_mtt_hierarchy_depth_intra_slice_luma | ue(v) |
| if( sps_max_mtt_hierarchy_depth_intra_slice_luma != 0 ) { | |
| sps_log2_diff_max_bt_min_qt_intra_slice_luma | ue(v) |
| sps_log2_diff_max_tt_min_qt_intra_slice_luma | ue(v) |
| } | |
| if( sps_max_mtt_hierarchy_depth_inter_slices != 0 ) { | |
| sps_log2_diff_max_bt_min_qt_inter_slice | ue(v) |
| sps_log2_diff_max_tt_min_qt_inter_slice | ue(v) |
| } | |
| if( qtbtt_dual_tree_intra_flag ) { | |
| sps_log2_diff_min_qt_min_cb_intra_slice_chroma | ue(v) |
| sps_max_mtt_hierarchy_depth_intra_slice_chroma | ue(v) |
| if ( sps_max_mtt_hierarchy_depth_intra_slice_chroma != 0 ) { | |
| sps_log2_diff_max_bt_min_qt_intra_slice_chroma | ue(v) |
| sps_log2_diff_max_tt_min_qt_intra_slice_chroma | ue(v) |
| } | |
| } | |
| ... | |
| rbsp_trailing_bits( ) | |
| } | |

log2_ctu_size_minus2 plus 2 specifies the luma coding tree block size of each CTU. log2_min_luma_coding_block_size_minus2 plus 2 specifies the minimum luma coding block size. The variables CtbLog2SizeY, CtbSizeY, MinCbLog2SizeY, MinCbSizeY, MinTbLog2SizeY, MaxTbLog2SizeY, MinTbSizeY, MaxTbSizeY, Pic WidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

$$CtbLog2SizeY = \text{log2\_ctu\_size\_minus2} + 2 \quad (7\text{-}9)$$

$$CtbSizeY = 1 \ll CTBLog2SizeY \quad (7\text{-}10)$$

$$MinCbLog2SizeY = \text{log2\_min\_luma\_coding\_block\_size\_minus2} + 2 \quad (7\text{-}11)$$

$$MinCbSizeY = 1 \ll MinCBLog2SizeY \quad (7\text{-}12)$$

$$MinTbLog2SizeY = 2 \quad (7\text{-}13)$$

$$MaxTbLog2SizeY = 6 \quad (7\text{-}14)$$

$$MinTbSizeY = 1 \ll MinTbLog2SizeY \quad (7\text{-}15)$$

$$MaxTbSizeY = 1 \ll MaxTbLog2SizeY \quad (7\text{-}16)$$

$$PicWidthInCtbsY = Ceil(\text{pic\_width\_in\_luma\_samples} \div CtbSizeY) \quad (7\text{-}17)$$

$$PicHeightInCtbsY = Ceil(\text{pic\_height\_in\_luma\_samples} \div CtbSizeY) \quad (7\text{-}18)$$

$$PicSizeInCtbsY = PicWidthInCtbsY * PicHeightInCtbsY \quad (7\text{-}19)$$

$$PicWidthInMinCBsY = \text{pic\_width\_in\_luma\_samples}/MinCbSizeY \quad (7\text{-}20)$$

$$PicHeightInMinCbsY = \text{pic\_height\_in\_luma\_samples}/MinCbSizeY \quad (7\text{-}21)$$

$$PIcSizeInMinCbsY = PicWidthInMinCbsY * PicHeightInMinCbsY \quad (7\text{-}22)$$

$$PicSizeInSamplesY = \text{pic\_width\_in\_luma\_samples} * \text{pic\_height\_in\_luma\_samples} \quad (7\text{-}23)$$

$$PicWidthInSamplesC = \text{pic\_width\_in\_luma\_samples}/SubWidthC \quad (7\text{-}24)$$

$$PicHeightInSamplesC = \text{pic\_height\_in\_luma\_samples}/SubHeightC \quad (7\text{-}25)$$

2.2.2 CTUs in a Picture

Figure 4:
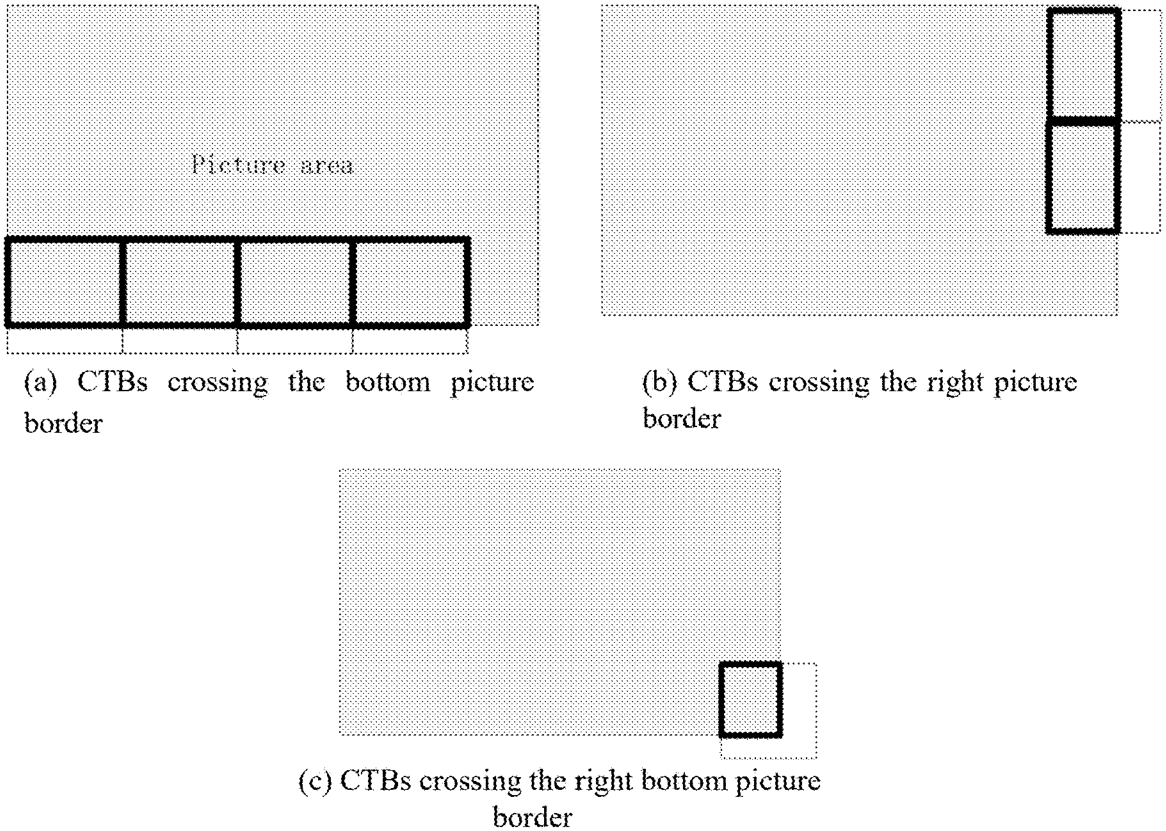
FIG. 4 illustrates an example of coding tree blocks (CTBs) crossing picture borders.

Suppose the CTB/largest coding unit (LCU) size indicated by M×N (typically M is equal to N), and for a CTB located at picture border (or tile or slice or other types of borders, picture border is taken as an example), K×L samples are within picture border wherein either K<M or L<N. For those CTBs as depicted in FIG. 4 (showing examples of CTBs crossing picture borders), the CTB size is still equal to M×N, however, the bottom boundary/right boundary of the CTB is outside the picture.

2.3 Coding Flow of a Video Codec

Figure 24:
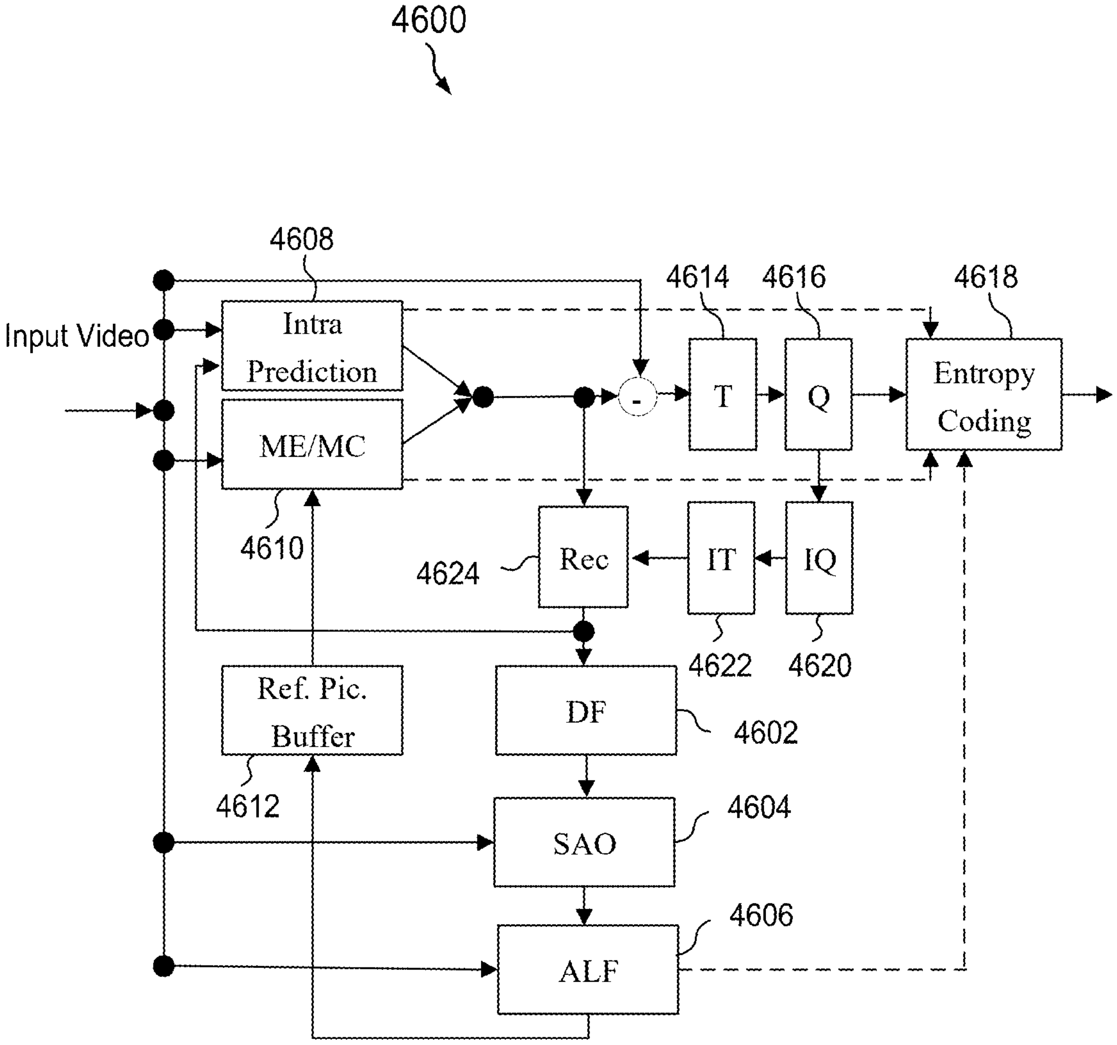
FIG. 24 is a schematic diagram of an example encoder.

FIG. 24 shows an example of encoder block diagram of VVC, which contains three in-loop filtering blocks: deblocking filter (DF) 4602, sample adaptive offset (SAO) 4604, and ALF 4606. Unlike DF 4602, which uses predefined filters, SAO 4604 and ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. ALF 4606 is located at the last processing stage of each picture and can be regarded as a tool that catches and fix artifacts created by the previous stages.

2.4 Deblocking Filter

The input of the deblocking (DB) filter is the reconstructed samples before in-loop filters. The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

2.4.1 Boundary Decision

Figures 5, 6:
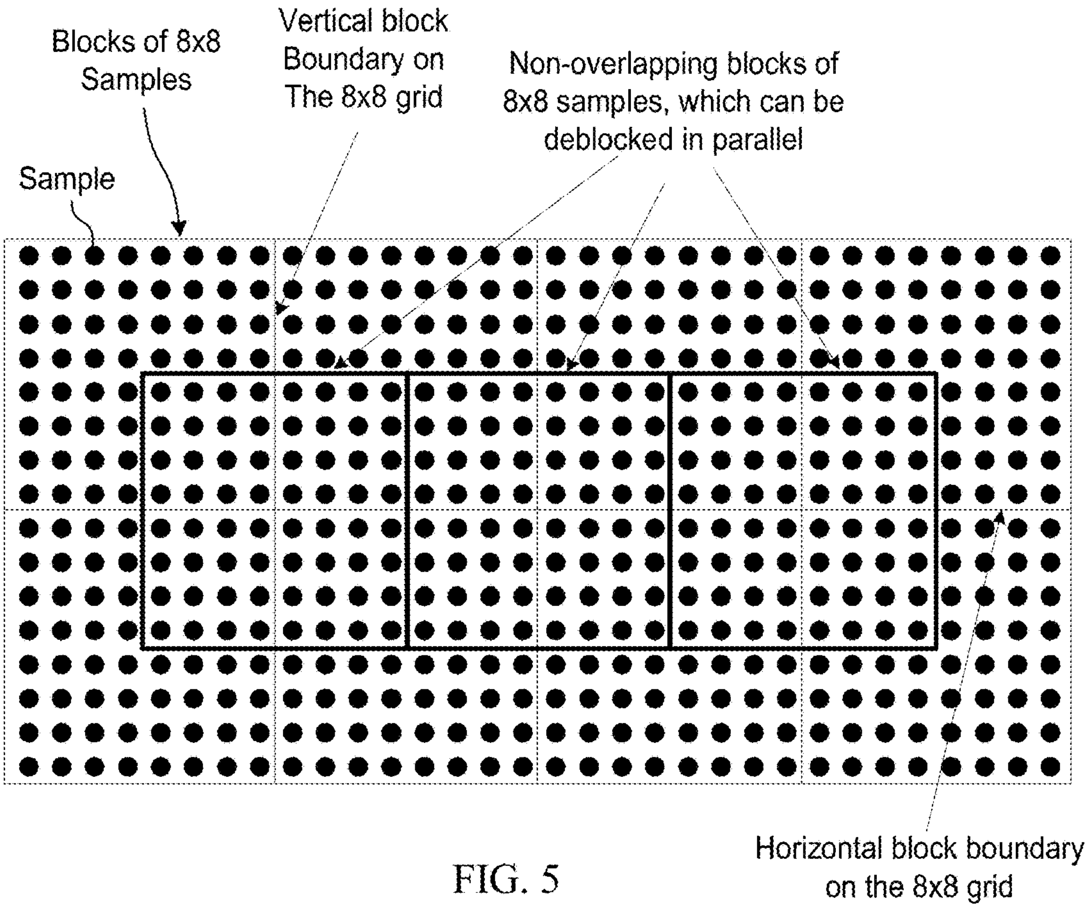
FIG. 5 illustrates an example of picture samples and horizontal and vertical block boundaries on the 8×8 grid.
FIG. 6 illustrates an example of pixels involved in filter on/off decision and strong/weak filter selection.

Filtering is applied to 8×8 block boundaries, such as those shown in FIG. 5 (which illustrates picture samples and horizontal and vertical block boundaries on the 8×8 grid, and the nonoverlapping blocks of the 8×8 samples, which can be deblocked in parallel). In addition, such boundaries must be a transform block boundary or a coding subblock boundary, for example due to usage of Affine motion prediction (ATMVP). For other boundaries, deblocking filtering is disabled.

2.4.2 Boundary Strength Calculation

For a transform block boundary/coding subblock boundary, if the boundary is located in the 8×8 grid, the boundary may be filtered and the setting of bS[xDi][yDj] (wherein [xDi][yDj] denotes the coordinate) for this edge as defined in Table 1 and Table 2, respectively.

TABLE 1

Boundary strength (when SPS intra block copy (IBC) is disabled)

| Priority | Conditions | Y | U | V |
|---|---|---|---|---|
| 5 | At least one of the adjacent blocks is intra | 2 | 2 | 2 |
| 4 | Transform unit (TU) boundary and at least one of the adjacent blocks has non-zero transform coefficients | 1 | 1 | 1 |
| 3 | Reference pictures or number of motion vectors (MVs) (1 for uni-prediction, 2 for bi-prediction) of the adjacent blocks are different | 1 | N/A | N/A |

TABLE 1-continued

| Boundary strength (when SPS intra block copy (IBC) is disabled) | | | | |
|---|---|---|---|---|
| Priority | Conditions | Y | U | V |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

| Boundary strength (when SPS IBC is enabled) | | | | |
|---|---|---|---|---|
| Priority | Conditions | Y | U | V |
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3 Deblocking Decision for Luma Component

The deblocking decision process is described in this sub-section. FIG. 6 illustrates pixels involved in filter on/off decision and strong/weak filter selection. Wider-stronger luma filter is filters are used only if all the Condition1, Condition2 and Condition 3 are TRUE. The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))? TRUE: FALSE bSideQisLargeBlk=((edge type is vertical and $q_0$ belongs to CU with width>=32)||(edge type is horizontal and $q_0$ belongs to CU with height>=32))? TRUE: FALSE Based on bSidePisLargeBlk and bSideQisLargeBlk, the condition 1 is defined as follows:

Condition1=(bSidePisLargeBlk||bSidePisLargeBlk)? TRUE: FALSE

Next, if Condition 1 is true, the condition 2 will be further checked. First, the following variables are derived:

```
dp0, dp3, dq0, dq3 are first derived as in HEVC
if (p side is greater than or equal to 32)
  dp0 = ( dp0 + Abs( p50 − 2 * p40 + p30 ) + 1 ) >> 1
  dp3 = ( dp3 + Abs( p53 − 2 * p43 + p33 ) + 1 ) >> 1
if (q side is greater than or equal to 32)
  dq0 = ( dq0 + Abs( q50 − 2 * q40 + q30 ) + 1 ) >> 1
  dq3 = ( dq3 + Abs( q53 − 2 * q43 + q33 ) + 1 ) >> 1
Condition2 = (d < β) ? TRUE: FALSE
    where d= dp0 + dq0 + dp3 + dq3.
```

If Condition1 and Condition2 are valid, whether any of the blocks uses sub-blocks is further checked:

```
If (bSidePisLargeBlk)
 {
  If (mode block P == SUBBLOCKMODE)
    Sp =5
   else
    Sp =7
}
else
 Sp = 3
If (bSideQisLargeBlk)
 {
  If (mode block Q == SUBBLOCKMODE)
    Sq =5
   else
    Sq =7
  }
else
 Sq = 3
```

Finally, if both the Condition 1 and Condition 2 are valid, the deblocking method will check the condition 3 (the large block strong filter condition), which is defined as follows. In the Condition3 StrongFilterCondition, the following variables are derived:

```
dpq is derived as in HEVC.
sp3 = Abs( p3 − p0 ), derived as in HEVC
if (p side is greater than or equal to 32)
  if(Sp==5)
    sp3 = ( sp3 + Abs( p5 − p3 ) + 1) >> 1
  else
    sp3 = ( sp3 + Abs( p7 − p3 ) + 1) >> 1
sq3 = Abs( q0 − q3 ), derived as in HEVC
if (q side is greater than or equal to 32)
 If(Sq==5)
  sq3 = ( sq3 + Abs( q5 − q3 ) + 1) >> 1
 else
  sq3 = ( sq3 + Abs( q7 − q3 ) + 1) >> 1
```

As in HEVC, StrongFilterCondition=(dpq is less than (β>>2), sp3+sq3 is less than (3*β>>5), and Abs(p0−q0) is less than (5*tC+1)>>1)? TRUE: FALSE.

2.2.4 Stronger Deblocking Filter for Luma (Designed for Larger Blocks)

Bilinear filter is used when samples at either one side of a boundary belong to a large block. A sample belonging to a large block is defined as when the width>=32 for a vertical edge, and when height>=32 for a horizontal edge. The bilinear filter is listed below. Block boundary samples pi for i=0 to Sp−1 and qi for j=0 to Sq−1 (pi and qi are the i-th sample within a row for filtering vertical edge, or the i-th sample within a column for filtering horizontal edge) in HEVC deblocking described above) are then replaced by linear interpolation as follows:

$$p_i' = (f_i * \text{Middle}_{s,t} + (64 - f_i) * P_s + 32) \gg 6), \text{ clipped to } p_i \pm tcPD_i$$

$$q_j' = (g_j * \text{Middle}_{s,t} + (64 - g_j) * Q_s + 32) \gg 6), \text{ clipped to } q_j \pm tcPD_j$$

where $tcPD_i$ and $tcPD_j$ term is a position dependent clipping described above and $g_j$, $f_i$, $\text{Middle}_{s,t}$, $P_s$ and $Q_s$ are given below:

2.4.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped. Chroma deblocking is performed when bS is equal to 2, or bS is equal to 1 when a large block boundary is detected. The second and third condition is basically the same as HEVC luma strong filter decision as follows.

In the second condition d is then derived as in HEVC luma deblocking. The second condition will be TRUE when d is less than β. In the third condition StrongFilterCondition is derived as follows:

dpq is derived as in HEVC.

$$sp_3 = \text{Abs}(p_3 - p_0), \text{ derived as in } HEVC$$

$$sq_3 = \text{Abs}(q_0 - q_3), \text{ derived as in } HEVC$$

As in HEVC design, StrongFilterCondition=(dpq is less than (β>>2), sp3+sq3 is less than (β>>3), and Abs(p0−q0) is less than (5*tC+1)>>1)

2.4.6 Strong Deblocking Filter for Chroma

The following strong deblocking filter for chroma is defined:

$$p2' = (3 * p3 + 2 * p2 + p1 + p0 + q0 + 4) \gg 3$$

$$p1' = (2 * p3 + p2 + 2 * p1 + p0 + q0 + q1 + 4) \gg 3$$

$$p0' = (p3 + p2 + p1 + 2 * p0 + q0 + q1 + q2 + 4) \gg 3$$

An example chroma filter performs deblocking on a 4×4 chroma sample grid.

2.4.7 Position Dependent Clipping

The position dependent clipping tcPD is applied to the output samples of the luma filtering process involving strong and long filters that are modifying 7, 5, and 3 samples at the boundary. Assuming quantization error distribution, a clipping value may be increased for samples which are expected to have higher quantization noise, thus expected to have higher deviation of the reconstructed sample value from the true sample value.

For each P or Q boundary filtered with asymmetrical filter, depending on the result of decision-making process, position dependent threshold table is selected from two tables (e.g., Tc7 and Tc3 tabulated below) that are provided to decoder as a side information:

$$Tc7 = \{6, 5, 4, 3, 2, 1, 1\};\ Tc3 = \{6, 4, 2\};$$

$$tcPD = (Sp == 3)\ ?\ Tc3 : Tc7;$$

$$tcQD = (Sp == 3)\ ?\ Tc3 : Tc7;$$

For the P or Q boundaries being filtered with a short symmetrical filter, position dependent threshold of lower magnitude is applied:

Tc3={3, 2, 1};

Following defining the threshold, filtered p'i and q'i sample values are clipped according to tcP and tcQ clipping values:

$$p''i = Clip3(p'i + tcPi, p'i);$$

$$q''j = Clip3(q'j + tcQj, q'j - tcQj, q'j);$$

where p'i and q'i are filtered sample values, p"i and q"j are output sample value after the clipping and tcPi are clipping thresholds that are derived from the VVC tc parameter and tcPD and tcQD. The function Clip3 is a clipping function as it is specified in VVC.

2.4.8 Sub-Block Deblocking Adjustment

To enable parallel friendly deblocking using both long filters and sub-block deblocking the long filters is restricted to modify at most 5 samples on a side that uses sub-block deblocking (AFFINE or ATMVP or decoder-side motion vector refinement (DMVR)) as shown in the luma control for long filters. Further, the sub-block deblocking is adjusted such that that sub-block boundaries on an 8×8 grid that are close to a coding unit (CU) or an implicit TU boundary is restricted to modify at most two samples on each side.

The following applies to sub-block boundaries that not are aligned with the CU boundary.

```
If (mode block Q == SUBBLOCKMODE && edge !=0) {
 if (!(implicitTU && (edge == (64 / 4))))
  if (edge == 2 || edge == (orthogonalLength − 2) || edge == (56 / 4) ||
  edge == (72 / 4))
    Sp = Sq = 2;
   else
    Sp = Sq = 3;
 else
   Sp = Sq = bSideQisLargeBlk ? 5:3
}
```

where edge equal to 0 corresponds to CU boundary, edge equal to 2 or equal to orthogonalLength−2 corresponds to sub-block boundary 8 samples from a CU boundary etc. Where implicit TU is true if implicit split of TU is used.

2.5 Sample Adaptive Offset

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a coding tree unit (CTU). Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 7:
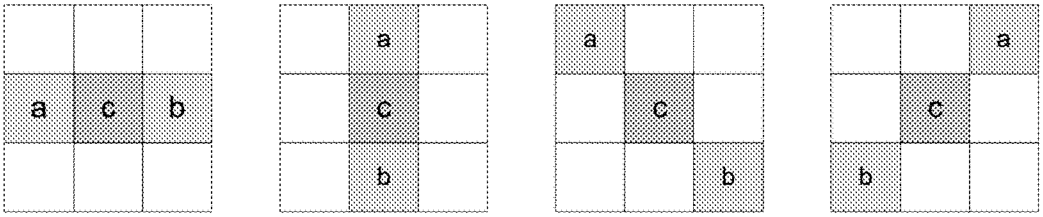
FIG. 7 illustrates four one dimensional (1-D) directional patterns for edge offset (EO) sample classification.

FIG. 7 illustrates four one dimensional (1-D) directional patterns for EO sample classification. These include horizontal (EO class=0), vertical (EO class=1), 135° diagonal (EO class=2), and 45° diagonal (EO class=3).

For a given EO class, each sample inside the coding tree block (CTB) is classified into one of five categories. The current sample value, labeled as "c," is compared with its two neighbors along the selected 1-D pattern. The classification rules for each sample are summarized in Table 3. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a && c==b) \|\|(c == a && c < b) |
| 3 | (c > a && c==b) \|\|(c == a && c > b) |
| 4 | c > a && c > b |
| 5 | None of above |

2.6 Geometry Transformation-Based Adaptive Loop Filter in JEM

The input of DB is the reconstructed samples after DB and SAO. The sample classification and filtering process are based on the reconstructed samples after DB and SAO. In the JEM, a geometry transformation-based adaptive loop filter (GALF) with block-based filter adaption is applied. For the luma component, one among 25 filters is selected for each 2×2 block, based on the direction and activity of local gradients.

2.6.1 Filter Shapes

Figure 8:
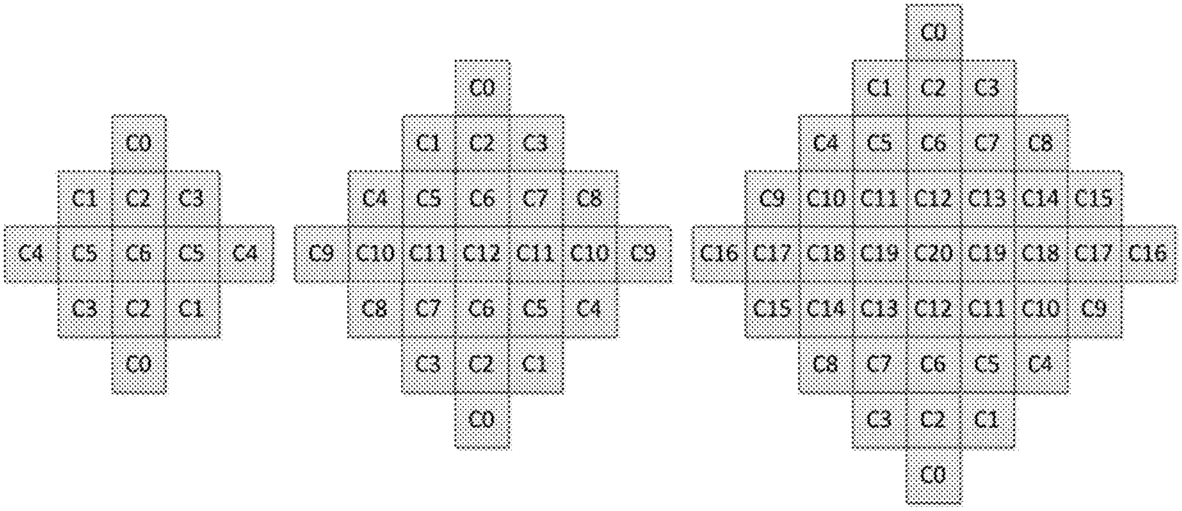
FIG. 8 illustrates an example of filter shapes for adaptive loop filter (ALF).

In the JEM, up to three diamond filter shapes (shown in FIG. 8 as filter shapes for ALF) can be selected for the luma component. An index is signaled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

2.6.1.1 Block Classification

Each 2×2 block is categorized into one out of 25 classes. The classification index C is derived based on its directionality D and a quantized value of activity $\hat{A}$, as follows:

$$C = 5D + \hat{A}. \tag{1}$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l},\ V_{k,l} = |2R(k, l) - R(k, l-1) - R(k, l+1)|, \tag{2}$$

$$g_h = \sum_{k=i-2}^{i+3} \sum_{l=j-2}^{j+3} H_{k,l},\ H_{k,l} = |2R(k, l) - R(k-1, l) - R(k+1, l)|, \tag{3}$$

$$g_{d1} = \sum_{k=i-2}^{i+3} \sum_{l=j-3}^{j+3} D1_{k,l},\ D1_{k,l} = |2R(k, l) - R(k-1, l-1) - R(k+1, l+1)| \tag{4}$$

$$g_{d2} = \sum_{k=i-2}^{i+3} \sum_{j=j-2}^{j+3} D2_{k,l},\ D2_{k,l} = |2R(k, l) - R(k-1, l+1) - R(k+1, l-1)| \tag{5}$$

(5) Indices i and j refer to the coordinates of the upper left sample in the 2×2 block and R(i, j) indicates a reconstructed sample at coordinate (i, j). Then D maximum and minimum values of the gradients of horizontal and vertical directions are set as:

$$g_{h,v}^{max} = \max(g_h, g_v),\ g_{h,v}^{min} = \min(g_h, g_v), \tag{6}$$

and the maximum and minimum values of the gradient of two diagonal directions are set as:

$$g_{d0,d1}^{max} = \max(g_{d0}, g_{d1}),\ g_{d0,d1}^{min} = \min(g_{d0}, g_{d1}), \tag{7}$$

To derive the value of the directionality D, these values are compared against each other and with two thresholds $t_1$ and $t_2$:

Step 1. If both $$g_{h,v}^{max} \le t_1 \cdot g_{h,v}^{min} \text{ and } g_{d0,d1}^{max} \le t_1 \cdot g_{d0,d1}^{min}$$

are true, D is set to 0.

Step 2. If $$g_{h,v}^{max} / g_{h,v}^{min} > g_{d0,d1}^{max} / g_{d0,d1}^{min},$$

continue to Step 3; otherwise continue from Step 4.

Step 3. If $$g_{h,v}^{max} > t_2 \cdot g_{h,v}^{min},$$

D is set to 2; otherwise D is set to 1.

Step 4. If $$g_{d0,d1}^{max} > t_2 \cdot g_{d0,d1}^{min},$$

D is set to 4; otherwise D is set to 3.

The activity value A is calculated as:

$$A = \sum_{k=i-2}^{i+3} \sum_{l=j-2}^{j+3} (V_{k,l} + H_{k,l}). \tag{8}$$

A is further quantized to the range of 0 to 4, inclusively, and the quantized value is denoted as Â. For both chroma components in a picture, no classification method is applied, i.e., a single set of ALF coefficients is applied for each chroma component.

2.6.1.2 Geometric Transformations of Filter Coefficients

Before filtering each 2×2 block, geometric transformations such as rotation or diagonal and vertical flipping are applied to the filter coefficients f(k, l), which is associated with the coordinate (k, l), depending on gradient values calculated for that block. This is equivalent to applying these transformations to the samples in the filter support region. The idea is to make different blocks to which ALF is applied more similar by aligning their directionality.

Figure 9:
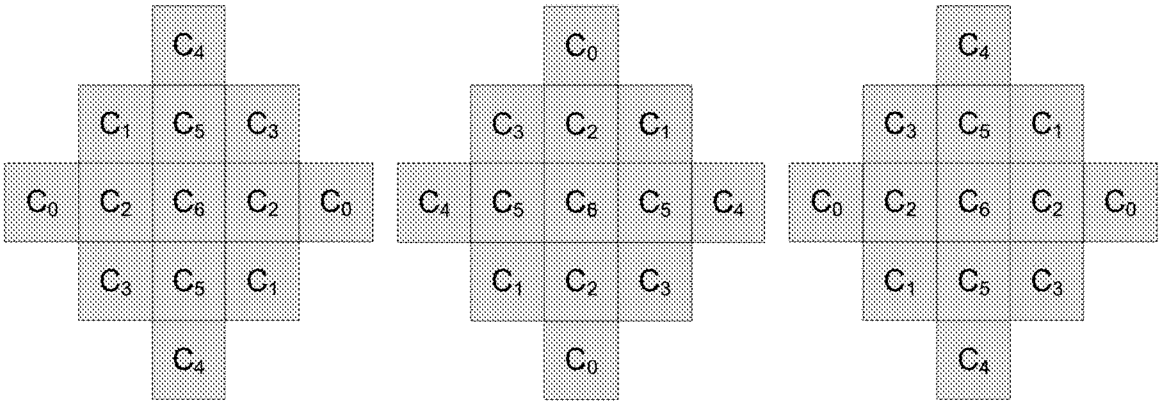
FIG. 9 illustrates an example of transformed coefficients for 5×5 diamond filter support.

Three geometric transformations, including diagonal, vertical flip and rotation are introduced:

$$\text{Diagonal: } f_D(k, l) = f(l, k),$$

$$\text{Vertical flip: } f_V(k, l) = f(k, K-l-1),$$

$$\text{Rotation: } f_R(k, l) = f(K-l-1, k).$$

where K is the size of the filter and 0≤k, l≤K−1 are coefficients coordinates, such that location (0,0) is at the upper left corner and location (K−1, K−1) is at the lower right corner. The transformations are applied to the filter coefficients f (k, l) depending on gradient values calculated for that block. The relationship between the transformation and the four gradients of the four directions are summarized in Table 4. FIG. 9 shows the transformed coefficients for each position based on the 5×5 diamond.

TABLE 4

Mapping of the gradient calculated for one block and the transformations.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.1.3 Filter Parameter Signaling

In the JEM, GALF filter parameters are signaled for the first CTU, i.e., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (e.g., 6 in JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k, l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

2.6.1.4 Filtering Process

At decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\sum_{k=-L/2}^{L/2}\sum_{l=-L/2}^{L/2} f(k,l)\times R(i+k,j+l) \tag{10}$$

Figure 10:
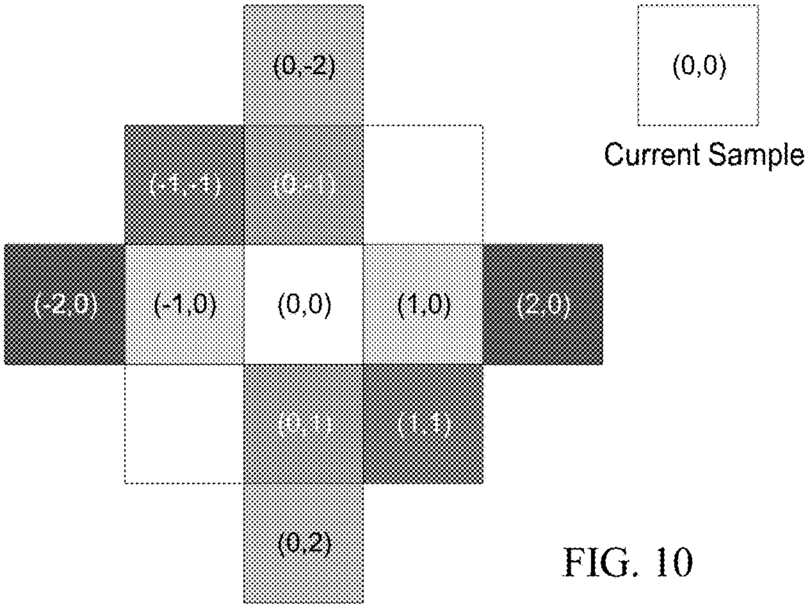
FIG. 10 illustrates an example of relative coordinates for 5×5 diamond filter support.

FIG. 10 shows an example of relative coordinates used for 5×5 diamond filter support supposing the current sample's coordinate (i, j) to be (0, 0). Samples in different coordinates filled with the same color are multiplied with the same filter coefficients.

2.7 Geometry Transformation-Based Adaptive Loop Filter (GALF) in VVC 2.7.1 GALF in VVC Test Model (VTM)-4

In VTM4.0, the filtering process of the Adaptive Loop Filter, is performed as follows:

$$O(x,y)=\sum_{(i,j)} w(i,j).I(x+i,y+j), \tag{11}$$

where samples I(x+i, y+j) are input samples, O(x, y) is the filtered output sample (i.e., filter result), and w(i, j) denotes the filter coefficients. In practice, in VTM4.0 it is implemented using integer arithmetic for fixed point precision computations:

$$O(x,y)=\left(\sum_{i=-\frac{L}{2}}^{\frac{L}{2}}\sum_{j=-\frac{L}{2}}^{\frac{L}{2}} w(i,j).I(x+i,y+j)+64\right)\gg 7, \tag{12}$$

where L denotes the filter length, and where w(i, j) are the filter coefficients in fixed point precision. GALF in VVC has the following major changes compared to that in JEM. The adaptive filter shape is removed. Only 7×7 filter shape is allowed for luma component and 5×5 filter shape is allowed for chroma component. Signaling of ALF parameters in removed from slice/picture level to CTU level. Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

2.8 Non-Linear ALF in VVC 2.8.1 Filtering Reformulation

Equation 11 can be reformulated, without coding efficiency impact, in the following expression:

$$O(x,y)=I(x,y)+\sum_{(i,j)\neq(0,0)} w(i,j).(I(x+i,y+j)-I(x,y)) \tag{13}$$

where w(i, j) are the same filter coefficients as in equation (11) [excepted w(0, 0) which is equal to 1 in equation (13) while it is equal to $1-\Sigma_{(i,j)\neq(0,0)}w(i,j)$ in equation (11)].

Using filter formula 13, VVC introduces the non-linearity to make ALF more efficient by using a simple clipping function to reduce the impact of neighbor sample values (I(x+i, y+j)) when they are too different with the current sample value (I(x, y)) being filtered. More specifically, the ALF filter is modified as follows:

$$O'(x,y)=I(x,y)+\sum_{(i,j)\neq(0,0)} w(i,j).K(I(x+i,y+j)-I(x,y),k(i,j)) \tag{14}$$

where K(d, b)=min(b, max(−b, d)) is the clipping function, and k(i, j) are clipping parameters, which depends on the (i, j) filter coefficient. The encoder performs the optimization to find the best k(i, j).

In an example implementation, the clipping parameters k(i, j) are specified for each ALF filter, one clipping value is signaled per filter coefficient. It means that up to 12 clipping values can be signaled in the bitstream per Luma filter and up to 6 clipping values for the Chroma filter. In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary. The sets of clipping values used in an example implementation are provided in Table 5. The 4 values have been selected by roughly equally splitting, in the logarithmic domain, the full range of the sample values (coded on 10 bits) for Luma, and the range from 4 to 1024 for Chroma. More precisely, the Luma table of clipping values have been obtained by the following formula:

$$AlfClip_L=\left\{\mathrm{round}\left(\left((M)^{\frac{1}{N}}\right)^{N-n+1}\right)\text{ for } n\in 1\ \ldots\ N\right]\Bigg\}, \tag{15}$$

$$\text{with } M=2^{10} \text{ and } N=4$$

Similarly, the Chroma tables of clipping values is obtained according to the following formula:

$$AlfClip_C=\left\{\mathrm{round}\left(A.\left(\left(\frac{M}{A}\right)^{\frac{1}{N-1}}\right)^{N-n}\right)\text{ for } n\in 1\ \ldots\ N\right]\Bigg\}, \tag{16}$$

$$\text{with } M=2^{10},\ N=4 \text{ and } A=4$$

TABLE 5

| Authorized clipping values | |
|---|---|
| | INTRA/INTER tile group |
| LUMA | {1024, 181, 32, 6} |
| CHROMA | {1024, 161, 25, 4} |

The selected clipping values are coded in the "alf_data" syntax element by using a Golomb encoding scheme corresponding to the index of the clipping value in the above Table 5. This encoding scheme is the same as the encoding scheme for the filter index.

2.9 Convolutional Neural Network-Based Loop Filters for Video Coding

2.9.1 Convolutional Neural Networks

In deep learning, a convolutional neural network (CNN), also known as ConvNet, is a class of deep neural networks, which may be applied to analyzing visual imagery. They have very successful applications in image and video recognition/processing, recommender systems, image classification, medical image analysis, natural language processing. CNNs are regularized versions of multilayer perceptrons. Multilayer perceptrons usually include fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs relatively little pre-processing compared to other image use classification/processing algorithms. This means that the network learns the filters that in other algorithms are hand-engineered. This independence from prior knowledge and human effort in feature design is a major advantage.

2.9.2 Deep Learning for Image/Video Coding

Deep learning-based image/video compression may have two implications: end-to-end compression purely based on neural networks and frameworks enhanced by neural networks. The first type may take an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, an implementation may use a fully connected network for the intra prediction in HEVC. In addition to intra prediction, deep learning is also exploited to enhance other modules. For example, an implementation may replace the in-loop filters of HEVC with a convolutional neural network and achieve promising results. Another example applies neural networks to improve the arithmetic coding engine.

2.9.3 Convolutional Neural Network Based In-Loop Filtering

In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

2.9.3.1 Training

The purpose of the training processing is to find the optimal value of parameters including weights and bias. First, a codec (e.g., HEVC test model (HM), JEM, VTM, etc.) is used to compress the training dataset to generate the distorted reconstruction frames. Then the reconstructed frames are fed into the CNN and the cost is calculated using the output of CNN and the groundtruth frames (original frames). Commonly used cost functions include sum of absolute difference (SAD) and mean square error (MSE). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage

2.9.3.2 Convolution Process

Figure 11:
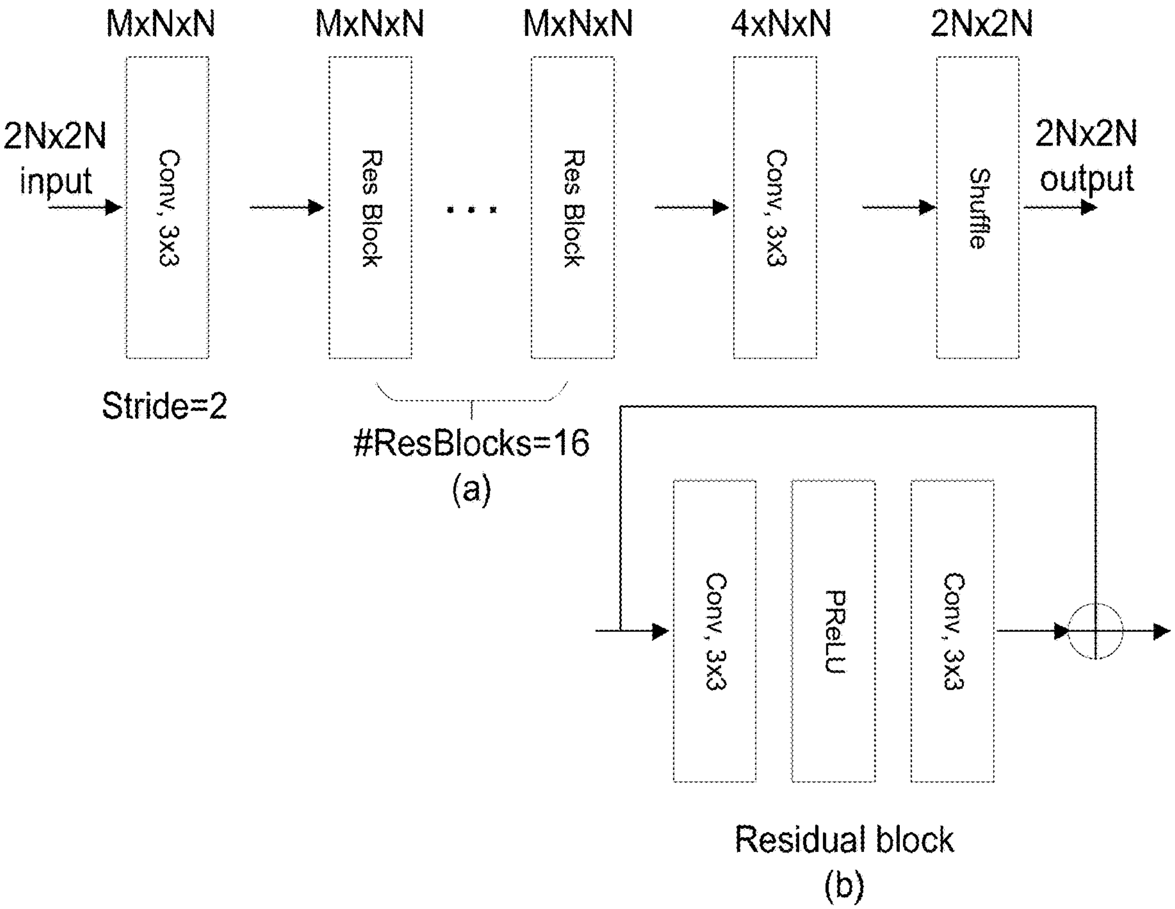
FIG. 11 illustrates an example convolutional neural network (CNN) architecture.

FIG. 11 illustrates an example CNN architecture. M denotes the number of feature maps. N stands for the number of samples in one dimension. (b) Construction of ResBlock (residual block) in (a). During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

In most deep convolutional neural networks, residual blocks are utilized as the basic module and stacked several times to construct the final network wherein in one example, the residual block is obtained by combining a convolutional layer, a Rectified Linear Unit (ReLU)/Parametric ReLU (PReLU) activation function and a convolutional layer as shown in FIG. 11.

2.9.3.3 Inference

During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF. Input samples may also include other auxiliary information decoded from the bitstream. For example, partitioning information, prediction information, residual information may be additionally fed into the CNN.

3. Technical Problems Solved by Disclosed Technical Solutions

Example neural network-based coding tools have the following problems. A geometric transform is not applied to the input samples of the NN-based coding tools. However, it is possible to obtain a better representation in the latent domain if the geometric transform can be applied to the input of the neural network.

4. A Listing of Solutions and Embodiments

To solve the above-described problems, methods as summarized below are disclosed. The embodiments should be considered as examples to explain the general concepts and should not be interpreted in a narrow way. Furthermore, these embodiments can be applied individually or combined in any manner.

One or more neural network (NN) models are trained as coding tools to improve the efficiency of video coding. Those NN-based coding tools can be used to replace or enhance the modules involved in a video codec. For example, a NN model can serve as an additional intra prediction mode, inter prediction mode, transform kernel, or loop-filter. This invention elaborates how to apply a geometric transform to the input samples and output samples of a NN model. It should be noted that the NN models could be used as any coding tools, such as NN-based intra and/or inter prediction, NN-based super-resolution, NN-based motion compensation, NN-based reference generation, NN-based fractional pixel interpolation, NN-based in-loop/post filtering, etc. In the disclosure, a NN model can be any kind of NN architectures, such as a convolutional neural network or a fully connected neural network, or a combination of convolutional neural networks and fully connected neural networks.

In the following discussion, a video unit may be a sequence, a picture, a slice, a tile, a brick, a subpicture, a coding tree unit (CTU) and/or coding tree block (CTB), a CTU and/or CTB row, one or multiple coding units (CUs) and/or coding blocks (CBs), one ore multiple CTUs and/or CTBs, one or multiple Virtual Pipeline Data Unit (VPDU), a sub-region within a picture, slice, tile, and/or brick. A father video unit represents a unit larger than the video unit. Typically, a father unit will contain several video units, for example when the video unit is CTU, the father unit could be slice, CTU row, multiple CTUs, etc.

Example 1

In an example, a geometric transform is applied to an input and/or output of a NN model. For example, a video unit with dimensions W×H (W and H mean width and height respectively), such as a picture, slice, tile, and/or block may be modified in a first way before it is fed into an in-loop processing module or a post-processing module. An output video unit from an in-loop processing module or a post-processing module may be modified in a second way before it is used as the final output or being used as a reference picture.

Example 2

In one example, the in-loop processing module or the post-processing module may comprise at least one NN model. In this disclosure, an in-loop processing module or a post-processing module may also be referred to as a NN-model.

Example 3

In one example, the input and/or output of a NN model is a video unit.

Example 4

In one example, the modification to the video unit refers to one or more geometric transforms such as reflection, rotation, flipping, etc.

Example 5

In one example, suppose P(x, y) represents a video unit to be processed by a NN model, where x and y represents the horizontal and vertical coordinates of samples in the video unit, P stands for the sample value (similar notations applied to the following bullets). P'(x, y)=F(P(x, y)) may be fed into the NN model, wherein F is any function that can be applied to modify a video unit.

Example 6

In one example, suppose P(x, y) represents a video unit output from a NN model, P'(x, y)=G(P(x, y)) may be output and/or stored and/or being used as a reference video unit, wherein G is any function that can be applied to modify a video unit.

Example 7

In one example, G should be an anti-operation of F, e.g., G(F(X))=X, where X is a picture.

Example 8

In one example, F and G may be flipping and/or rotation.

Example 9

Figure 12:
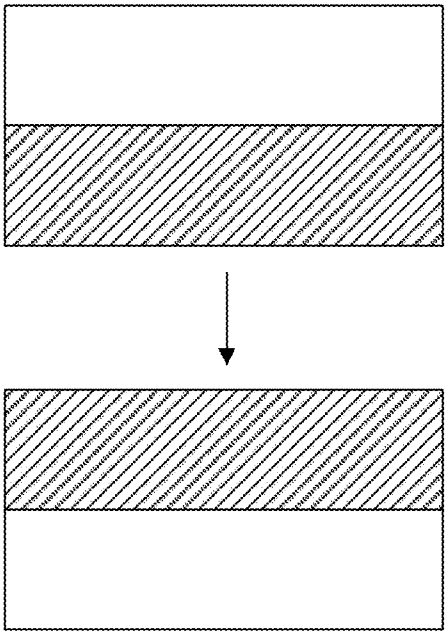
FIG. 12 illustrates an example vertical flip.

In one example, a video unit is first vertically flipped as shown in FIG. 12 and then fed into the NN model. The vertical flip is defined as:

$$P'(x, y) = P(x, H-1-y)$$

Example 10

In one example, the output video unit from a NN model is first vertically flipped as shown in FIG. 12 and then stored/used as a reference video unit. The vertical flip is defined in the equation in the example above.

Example 11

Figure 13:
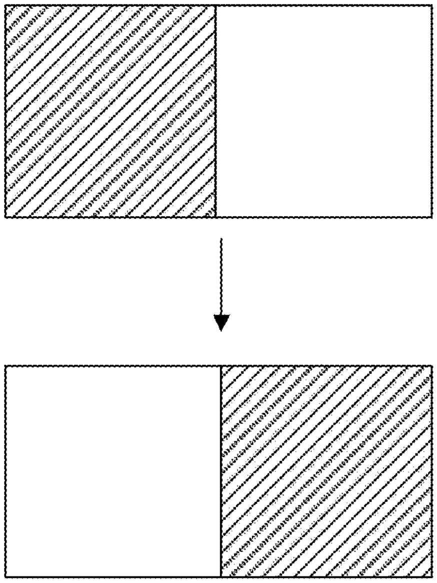
FIG. 13 illustrates an example horizontal flip.

In one example, a video unit is first horizontally flipped as shown in FIG. 13 and then fed into the NN model. The horizontal flip is defined as:

$$P'(x, y) = P(W-1-x, y)$$

Example 12

In one example, the output video unit from a NN model is first horizontally flipped as shown in FIG. 13 and then stored/used as a reference video unit. The horizontal flip is defined in the equation in the example above.

Example 13

Figure 14:
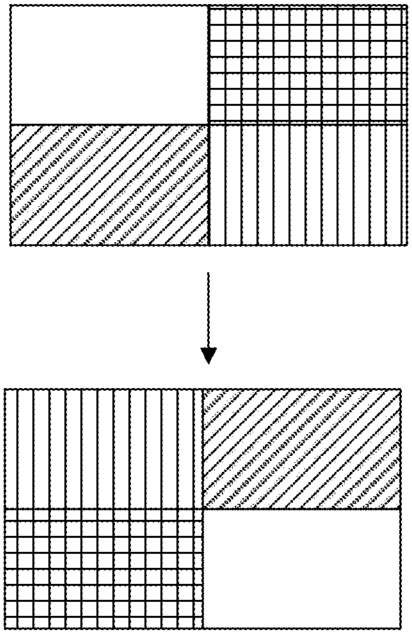
FIG. 14 illustrates an example 180 degree rotation.

In one example, a video unit is first rotated by 180 degrees (°) as shown in FIG. 14 and then fed into the NN model. The 180° rotation is defined as:

$$P'(x, y) = P(W-1-x, H-1-y)$$

Example 14

In one example, the output video unit from a NN model is first rotated by 180° as shown in FIG. 14 and then stored/used as a reference video unit. The 180° rotation is defined in the equation in the example above.

Example 15

Figure 15:
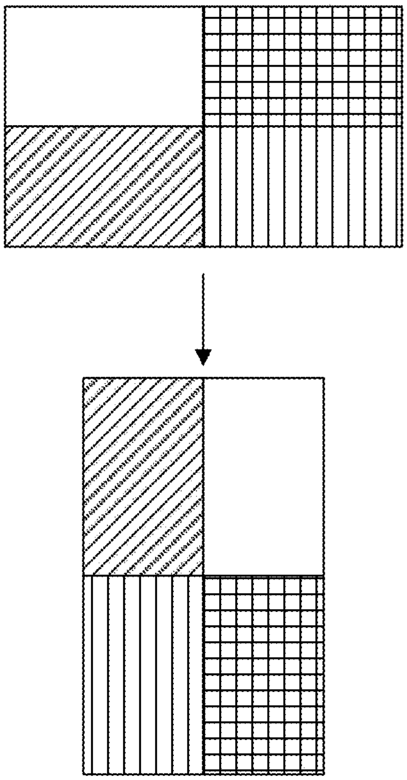
FIG. 15 illustrates an example 90 degree rotation.

In one example, a video unit is first rotated clockwise by 90° as shown in FIG. 15 and then fed into the NN model. The clockwise 90° rotation is defined as:

$$P'(x, y) = P(\text{height} - y - 1, x)$$

Example 16

In one example, the output video unit from a NN model is first rotated clockwise by 90° as shown in FIG. 15 and then stored/used as a reference video unit. The clockwise 90° rotation is defined in the equation in the example above.

Example 17

Figure 16:
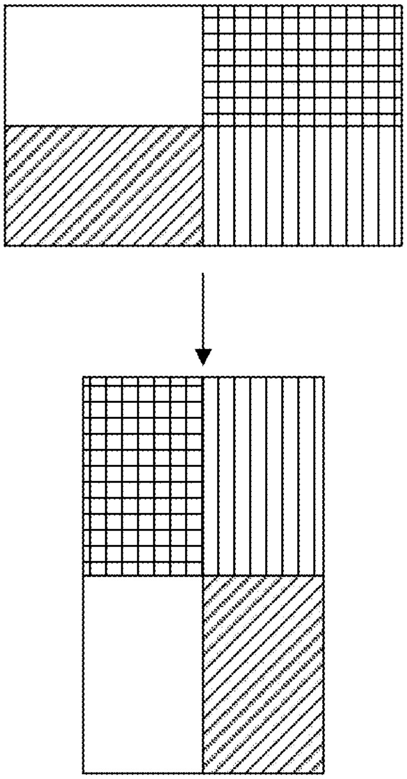
FIG. 16 illustrates an example 270 degree rotation.

In one example, a video unit is first rotated clockwise by 270° as shown in FIG. 16 and then fed into the NN model. The clockwise 270° rotation is defined as:

$P'(x, y)=P(y, x)$

Example 18

In one example, the output video unit from a NN model is first rotated clockwise by 270° as shown in FIG. 16 and then stored/used as a reference video unit. The clockwise 270° rotation is defined in the equation in the example above.

Example 19

Figure 17:
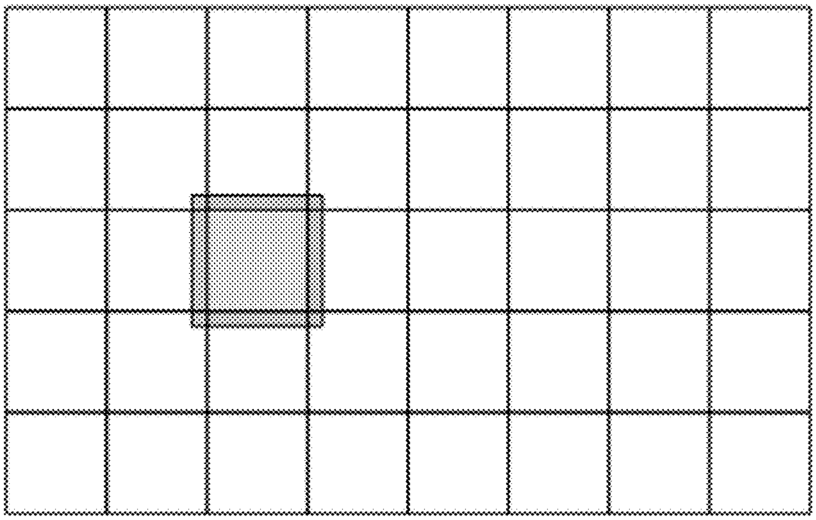
FIG. 17 illustrates an example extended input block comprising samples from current video unit and neighboring video units.

In one example, the input of the NN model comprises samples from both current video unit and neighbouring video units as shown in FIG. 17 (e.g., as an extended input block that comprises samples from current video unit and neighbouring video units). Before feeding into the NN model, the whole input block may be modified. In one example, the whole input block, e.g., the gray region shown in FIG. 17, may be flipped/rotated before feeding into the NN model.

Example 20

In one example, padding samples may be modified together with existing samples. In another example, padding samples may be padded after the modification.

Example 21

In one example, the derivation and/or signaling of geometric transform type is employed. Whether to and/or how to apply a geometric transform type on the input and/or output of a NN model may be derived on-the-fly. In one example, whether to and/or how to apply a geometric transform type on the input and/or output of a NN model may be derived based on the content of a video unit.

In one example, whether to and/or how to apply a geometric transform type on the input and/or output of a NN model may depend on coding information such as picture and/or slice type, temporal layer, quantization parameter (QP), color format, color component, coding mode, dimensions of the video unit, etc. In one example, the geometric transform is only applied to the NN models of inter slice. In one example, the geometric transform is only applied to the NN models of luma component.

Example 22

In one example, whether to and/or how to apply a geometric transform on the input and/or output of a NN model may be signaled by at least one syntax element (SE) from the encoder to the decoder, such as in sequence parameter set (SPS), picture parameter set (PPS), adaptation parameter set (APS), picture header, slice header, CTU, CU, etc. In one example, a first syntax element may be signaled to indicate whether a geometric transform is applied or not.

In one example, a second syntax element may be signaled to indicate which geometric transform is applied. The second syntax element may be signaled only if the first syntax indicates a geometric transform is applied.

A single SE may be signaled. The SE(s) may be coded using fixed length coding, exponential Golomb (EG) coding, truncated (unary) coding, etc. The SE(s) may be coded with at least one context in arithmetic coding. The SE(s) may be bypass coded. The SE(s) may be signaled only if modification is allowed.

Example 23

In one example, the processing modules and/or the NN models may be different for different modifications on the video unit. The processing modules and/or the NN models may be different depending on whether a modification is applied on the video unit.

Example 24

In one example, the processing modules and/or the NN models may be the same for different modifications on the video unit. The processing modules and/or the NN models may be the same no matter whether a modification is applied on the video unit.

Example 25

In one example, whether to and/or how to apply the disclosed methods above may be signaled at sequence level, group of pictures level, picture level, slice level, and/or tile group level, such as in a sequence header, picture header, a SPS, a video parameter set (VPS), dependency parameter set (DPS), decoding capability information (DCI), PPS, APS, slice header, and/or tile group header.

Example 26

In one example, whether to and/or how to apply the disclosed methods above may be dependent on coded information, such as block size, color format, single and/or dual tree partitioning, color component, slice and/or picture type, etc.

Example 27

In one example, the disclosed methods can be applied to the input and/or output of any NN models for video coding, such as NN-based intra and/or inter prediction, NN-based super-resolution, NN-based motion compensation, NN-based reference generation, NN-based fractional pixel interpolation, NN-based in-loop/post filtering, etc. In one example, the disclosed methods are applied on NN-based in-loop filtering.

Figure 18:
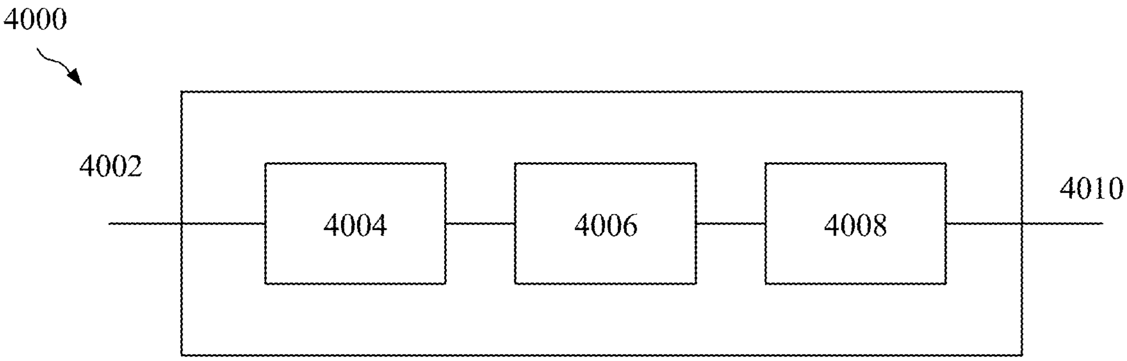
FIG. 18 is a block diagram showing an example video processing system.

FIG. 18 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8- or 10-bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by a component 4008 for generating pixel values or displayable video that is sent to a display interface 4010. The process of generating user-viewable video from the bitstream representation is sometimes called video decompression. Furthermore, while certain video processing operations are referred to as “coding” operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 19:
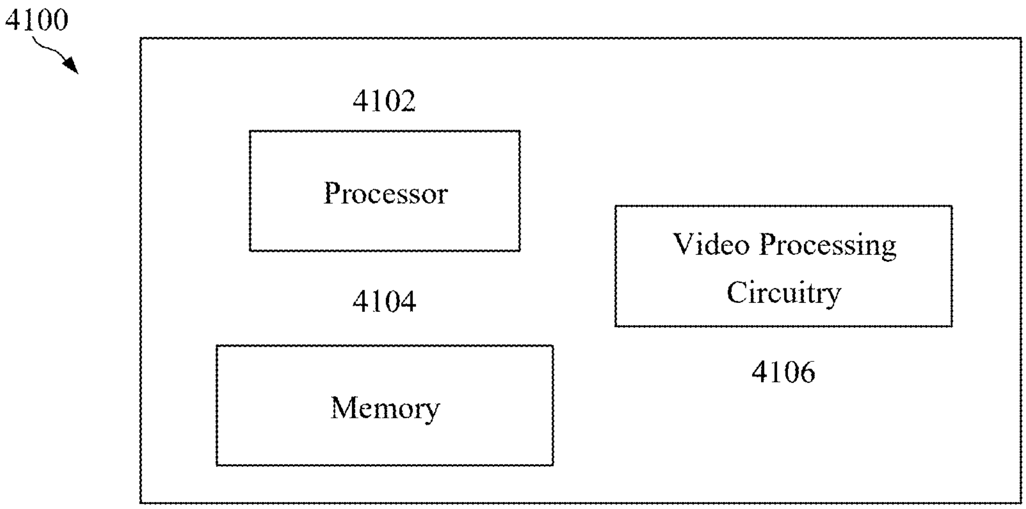
FIG. 19 is a block diagram of an example video processing apparatus.

FIG. 19 is a block diagram of an example video processing apparatus 4100. The apparatus 4100 may be used to implement one or more of the methods described herein. The apparatus 4100 may be embodied in a smartphone, tablet, computer, Internet of Things (IoT) receiver, and so on. The apparatus 4100 may include one or more processors 4102, one or more memories 4104 and video processing circuitry 4106. The processor(s) 4102 may be configured to implement one or more methods described in the present document. The memory (memories) 4104 may be used for storing data and code used for implementing the methods and techniques described herein. The video processing circuitry 4106 may be used to implement, in hardware circuitry, some techniques described in the present document. In some embodiments, the video processing circuitry 4106 may be at least partly included in the processor 4102, e.g., a graphics co-processor.

Figure 20:
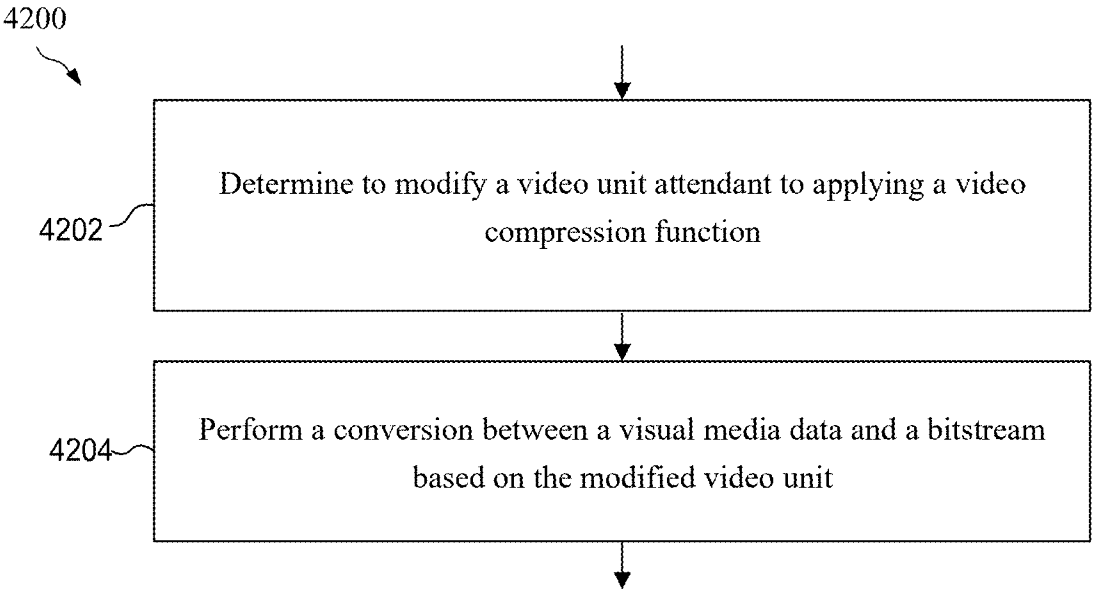
FIG. 20 is a flowchart for an example method of video processing.

FIG. 20 is a flowchart for an example method 4200 of video processing. The method 4200 includes determining to modify a video unit attendant to applying a video compression function at step 4202. A conversion is performed between a visual media data and a bitstream based on the modified video unit at step 4204. The conversion of step 4204 may include encoding at an encoder or decoding at a decoder, depending on the example.

It should be noted that the method 4200 can be implemented in an apparatus for processing video data comprising a processor and a non-transitory memory with instructions thereon, such as video encoder 4400, video decoder 4500, and/or encoder 4600. In such a case, the instructions upon execution by the processor, cause the processor to perform the method 4200. Further, the method 4200 can be performed by a non-transitory computer readable medium comprising a computer program product for use by a video coding device. The computer program product comprises computer executable instructions stored on the non-transitory computer readable medium such that when executed by a processor cause the video coding device to perform the method 4200.

Figure 21:
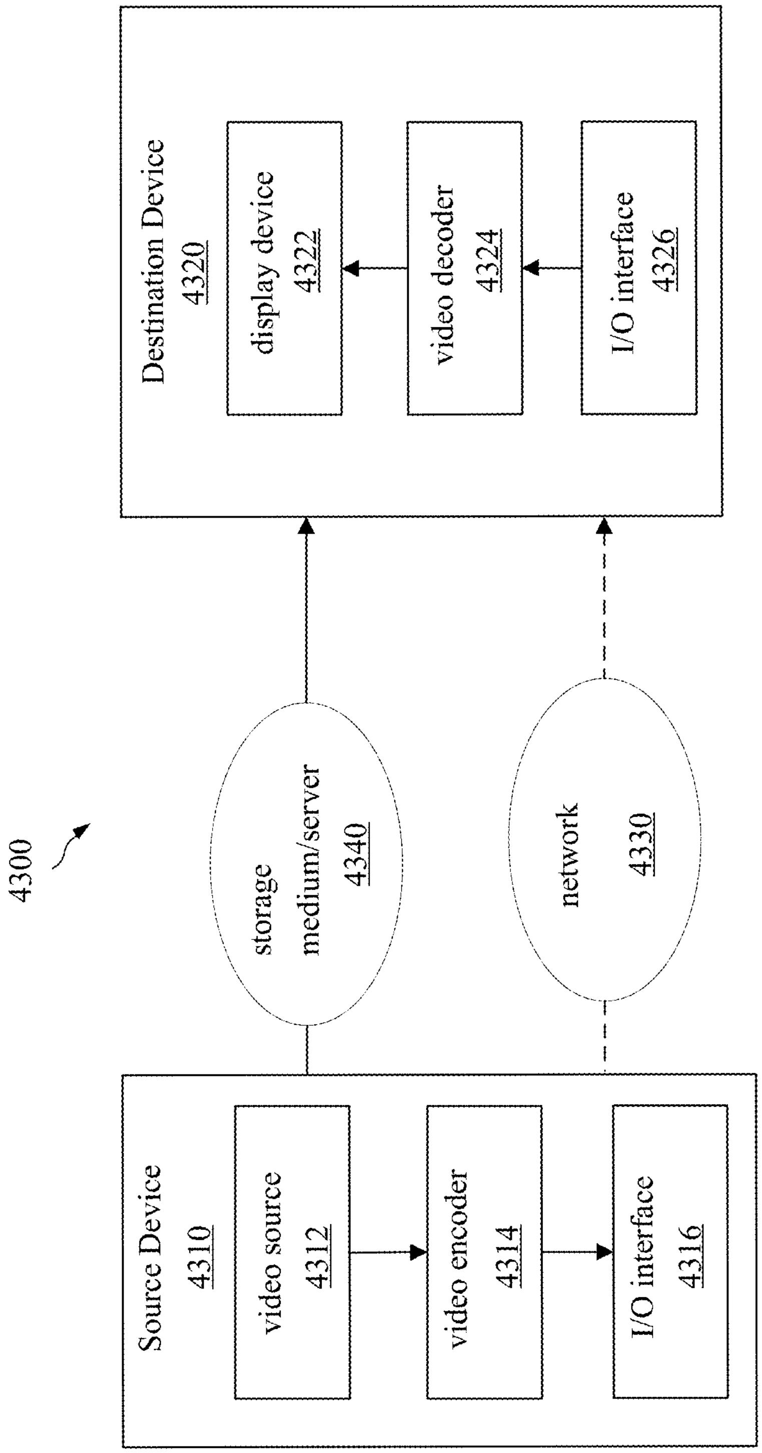
FIG. 21 is a block diagram that illustrates an example video coding system.

FIG. 21 is a block diagram that illustrates an example video coding system 4300 that may utilize the techniques of this disclosure. The video coding system 4300 may include a source device 4310 and a destination device 4320. Source device 4310 generates encoded video data which may be referred to as a video encoding device. Destination device 4320 may decode the encoded video data generated by source device 4310 which may be referred to as a video decoding device.

Source device 4310 may include a video source 4312, a video encoder 4314, and an input/output (I/O) interface 4316. Video source 4312 may include a source such as a video capture device, an interface to receive video data from a video content provider, and/or a computer graphics system for generating video data, or a combination of such sources. The video data may comprise one or more pictures. Video encoder 4314 encodes the video data from video source 4312 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 4316 may include a modulator/ demodulator (modem) and/or a transmitter. The encoded video data may be transmitted directly to destination device 4320 via I/O interface 4316 through network 4330. The encoded video data may also be stored onto a storage medium/server 4340 for access by destination device 4320.

Destination device 4320 may include an I/O interface 4326, a video decoder 4324, and a display device 4322. I/O interface 4326 may include a receiver and/or a modem. I/O interface 4326 may acquire encoded video data from the source device 4310 or the storage medium/server 4340. Video decoder 4324 may decode the encoded video data. Display device 4322 may display the decoded video data to a user. Display device 4322 may be integrated with the destination device 4320, or may be external to destination device 4320, which can be configured to interface with an external display device.

Video encoder 4314 and video decoder 4324 may operate according to a video compression standard, such as the High Efficiency Video Coding (HEVC) standard, Versatile Video Coding (VVC) standard and other current and/or further standards.

Figure 22:
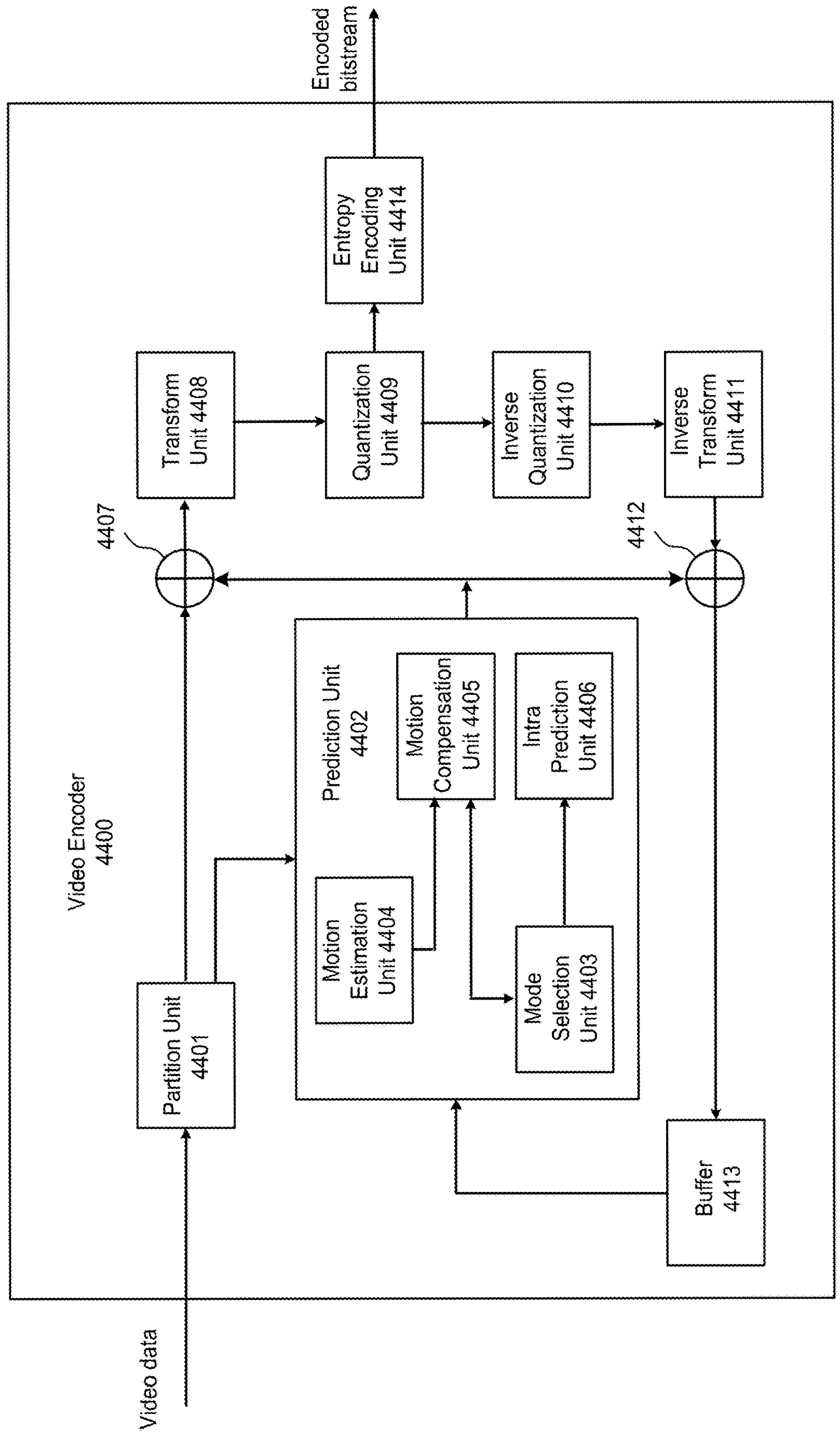
FIG. 22 is a block diagram that illustrates an example encoder.

FIG. 22 is a block diagram illustrating an example of video encoder 4400, which may be video encoder 4314 in the system 4300 illustrated in FIG. 21. Video encoder 4400 may be configured to perform any or all of the techniques of this disclosure. The video encoder 4400 includes a plurality of functional components. The techniques described in this disclosure may be shared among the various components of video encoder 4400. In some examples, a processor may be configured to perform any or all of the techniques described in this disclosure.

The functional components of video encoder 4400 may include a partition unit 4401; a prediction unit 4402, which may include a mode select unit 4403, a motion estimation unit 4404, a motion compensation unit 4405, and an intra prediction unit 4406; a residual generation unit 4407; a transform processing unit 4408; a quantization unit 4409; an inverse quantization unit 4410; an inverse transform unit 4411; a reconstruction unit 4412; a buffer 4413; and an entropy encoding unit 4414.

In other examples, video encoder 4400 may include more, fewer, or different functional components. In an example, prediction unit 4402 may include an intra block copy (IBC) unit. The IBC unit may perform prediction in an IBC mode in which at least one reference picture is a picture where the current video block is located.

Furthermore, some components, such as motion estimation unit 4404 and motion compensation unit 4405 may be highly integrated, but are represented in the example of video encoder 4400 separately for purposes of explanation.

Partition unit 4401 may partition a picture into one or more video blocks. Video encoder 4400 and video decoder 4500 may support various video block sizes.

Mode select unit 4403 may select one of the coding modes, intra or inter, e.g., based on error results, and provide the resulting intra or inter coded block to a residual generation unit 4407 to generate residual block data and to a reconstruction unit 4412 to reconstruct the encoded block for use as a reference picture. In some examples, mode select unit 4403 may select a combination of intra and inter prediction (CIIP) mode in which the prediction is based on an inter prediction signal and an intra prediction signal. Mode select unit 4403 may also select a resolution for a motion vector (e.g., a sub-pixel or integer pixel precision) for the block in the case of inter prediction.

To perform inter prediction on a current video block, motion estimation unit 4404 may generate motion information for the current video block by comparing one or more reference frames from buffer 4413 to the current video block. Motion compensation unit 4405 may determine a predicted video block for the current video block based on the motion information and decoded samples of pictures from buffer 4413 other than the picture associated with the current video block.

Motion estimation unit 4404 and motion compensation unit 4405 may perform different operations for a current video block, for example, depending on whether the current video block is in an I slice, a P slice, or a B slice.

In some examples, motion estimation unit 4404 may perform uni-directional prediction for the current video block, and motion estimation unit 4404 may search reference pictures of list 0 or list 1 for a reference video block for the current video block. Motion estimation unit 4404 may then generate a reference index that indicates the reference picture in list 0 or list 1 that contains the reference video block and a motion vector that indicates a spatial displacement between the current video block and the reference video block. Motion estimation unit 4404 may output the reference index, a prediction direction indicator, and the motion vector as the motion information of the current video block. Motion compensation unit 4405 may generate the predicted video block of the current block based on the reference video block indicated by the motion information of the current video block.

In other examples, motion estimation unit 4404 may perform bi-directional prediction for the current video block, motion estimation unit 4404 may search the reference pictures in list 0 for a reference video block for the current video block and may also search the reference pictures in list 1 for another reference video block for the current video block. Motion estimation unit 4404 may then generate reference indexes that indicate the reference pictures in list 0 and list 1 containing the reference video blocks and motion vectors that indicate spatial displacements between the reference video blocks and the current video block. Motion estimation unit 4404 may output the reference indexes and the motion vectors of the current video block as the motion information of the current video block. Motion compensation unit 4405 may generate the predicted video block of the current video block based on the reference video blocks indicated by the motion information of the current video block.

In some examples, motion estimation unit 4404 may output a full set of motion information for decoding processing of a decoder. In some examples, motion estimation unit 4404 may not output a full set of motion information for the current video. Rather, motion estimation unit 4404 may signal the motion information of the current video block with reference to the motion information of another video block. For example, motion estimation unit 4404 may determine that the motion information of the current video block is sufficiently similar to the motion information of a neighboring video block.

In one example, motion estimation unit 4404 may indicate, in a syntax structure associated with the current video block, a value that indicates to the video decoder 4500 that the current video block has the same motion information as another video block.

In another example, motion estimation unit 4404 may identify, in a syntax structure associated with the current video block, another video block and a motion vector difference (MVD). The motion vector difference indicates a difference between the motion vector of the current video block and the motion vector of the indicated video block.

The video decoder 4500 may use the motion vector of the indicated video block and the motion vector difference to determine the motion vector of the current video block.

As discussed above, video encoder 4400 may predictively signal the motion vector. Two examples of predictive signaling techniques that may be implemented by video encoder 4400 include advanced motion vector prediction (AMVP) and merge mode signaling.

Intra prediction unit 4406 may perform intra prediction on the current video block. When intra prediction unit 4406 performs intra prediction on the current video block, intra prediction unit 4406 may generate prediction data for the current video block based on decoded samples of other video blocks in the same picture. The prediction data for the current video block may include a predicted video block and various syntax elements.

Residual generation unit 4407 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 4407 may not perform the subtracting operation.

Transform processing unit 4408 may generate one or more transform coefficient video blocks for the current video block by applying one or more transforms to a residual video block associated with the current video block.

After transform processing unit 4408 generates a transform coefficient video block associated with the current video block, quantization unit 4409 may quantize the transform coefficient video block associated with the current video block based on one or more quantization parameter (QP) values associated with the current video block.

Inverse quantization unit 4410 and inverse transform unit 4411 may apply inverse quantization and inverse transforms to the transform coefficient video block, respectively, to reconstruct a residual video block from the transform coefficient video block. Reconstruction unit 4412 may add the reconstructed residual video block to corresponding samples from one or more predicted video blocks generated by the prediction unit 4402 to produce a reconstructed video block associated with the current block for storage in the buffer 4413.

After reconstruction unit 4412 reconstructs the video block, the loop filtering operation may be performed to reduce video blocking artifacts in the video block.

Entropy encoding unit 4414 may receive data from other functional components of the video encoder 4400. When entropy encoding unit 4414 receives the data, entropy encoding unit 4414 may perform one or more entropy encoding operations to generate entropy encoded data and output a bitstream that includes the entropy encoded data.

Figure 23:
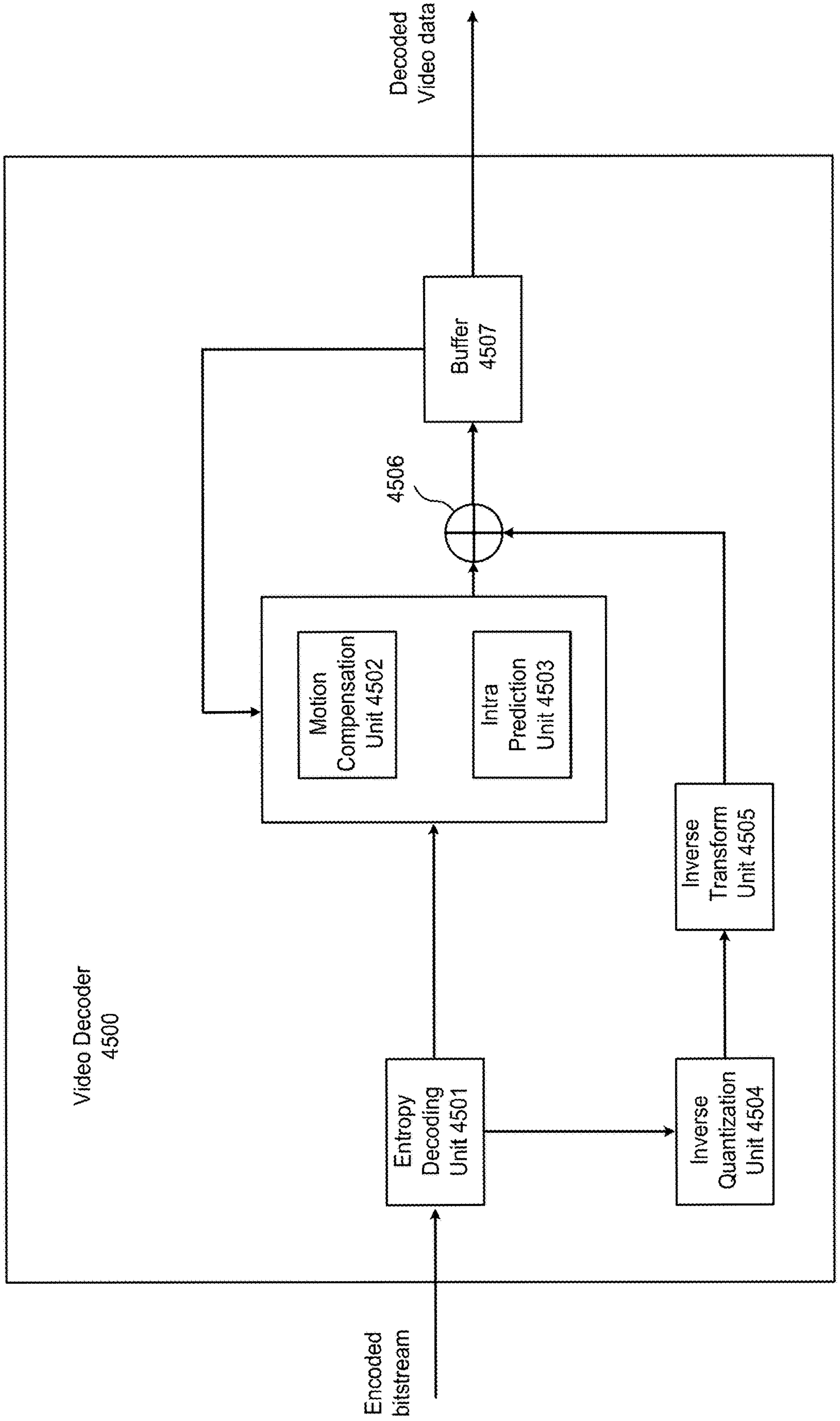
FIG. 23 is a block diagram that illustrates an example decoder.

FIG. 23 is a block diagram illustrating an example of video decoder 4500 which may be video decoder 4324 in the system 4300 illustrated in FIG. 21. The video decoder 4500 may be configured to perform any or all of the embodiments of this disclosure. In the example shown, the video decoder 4500 includes a plurality of functional components. The embodiments described in this disclosure may be shared among the various components of the video decoder 4500. In some examples, a processor may be configured to perform any or all of the embodiments described in this disclosure.

In the example shown, video decoder 4500 includes an entropy decoding unit 4501, a motion compensation unit 4502, an intra prediction unit 4503, an inverse quantization unit 4504, an inverse transformation unit 4505, a reconstruction unit 4506, and a buffer 4507. Video decoder 4500 may, in some examples, perform a decoding pass generally reciprocal to the encoding pass described with respect to video encoder 4400.

Entropy decoding unit 4501 may retrieve an encoded bitstream. The encoded bitstream may include entropy coded video data (e.g., encoded blocks of video data). Entropy decoding unit 4501 may decode the entropy coded video data, and from the entropy decoded video data, motion compensation unit 4502 may determine motion information including motion vectors, motion vector precision, reference picture list indexes, and other motion information. Motion compensation unit 4502 may, for example, determine such information by performing the AMVP and merge mode.

Motion compensation unit 4502 may produce motion compensated blocks, possibly performing interpolation based on interpolation filters. Identifiers for interpolation filters to be used with sub-pixel precision may be included in the syntax elements.

Motion compensation unit 4502 may use interpolation filters as used by video encoder 4400 during encoding of the video block to calculate interpolated values for sub-integer pixels of a reference block. Motion compensation unit 4502 may determine the interpolation filters used by video encoder 4400 according to received syntax information and use the interpolation filters to produce predictive blocks.

Motion compensation unit 4502 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 4503 may use intra prediction modes for example received in the bitstream to form a prediction block from spatially adjacent blocks. Inverse quantization unit 4504 inverse quantizes, i.e., de-quantizes, the quantized video block coefficients provided in the bitstream and decoded by entropy decoding unit 4501. Inverse transform unit 4505 applies an inverse transform.

Reconstruction unit 4506 may sum the residual blocks with the corresponding prediction blocks generated by motion compensation unit 4502 or intra prediction unit 4503 to form decoded blocks. If desired, a deblocking filter may also be applied to filter the decoded blocks in order to remove blockiness artifacts. The decoded video blocks are then stored in buffer 4507, which provides reference blocks for subsequent motion compensation/intra prediction and also produces decoded video for presentation on a display device.

FIG. 24 is a schematic diagram of an example encoder 4600. The encoder 4600 is suitable for implementing the techniques of VVC. The encoder 4600 includes three in-loop filters, namely a deblocking filter (DF) 4602, a sample adaptive offset (SAO) 4604, and an adaptive loop filter (ALF) 4606. Unlike the DF 4602, which uses predefined filters, the SAO 4604 and the ALF 4606 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 4606 is located at the last processing stage of each picture and can be regarded as a tool trying to catch and fix artifacts created by the previous stages.

The encoder 4600 further includes an intra prediction component 4608 and a motion estimation/compensation (ME/MC) component 4610 configured to receive input video. The intra prediction component 4608 is configured to perform intra prediction, while the ME/MC component 4610 is configured to utilize reference pictures obtained from a reference picture buffer 4612 to perform inter prediction. Residual blocks from inter prediction or intra prediction are fed into a transform (T) component 4614 and a quantization (Q) component 4616 to generate quantized residual transform coefficients, which are fed into an entropy coding component 4618. The entropy coding component 4618 entropy codes the prediction results and the quantized transform coefficients and transmits the same toward a video decoder (not shown). Quantization components output from the quantization component 4616 may be fed into an inverse quantization (IQ) components 4620, an inverse transform component 4622, and a reconstruction (REC) component 4624. The REC component 4624 is able to output images to the DF 4602, the SAO 4604, and the ALF 4606 for filtering prior to those images being stored in the reference picture buffer 4612.

A listing of solutions preferred by some examples is provided next.

The following solutions show examples of embodiments discussed herein.

1. A method for processing video data (e.g., method 4200 depicted in FIG. 20) comprising: determining (4202) to modify a video unit attendant to applying a video compression function; and performing (4204) a conversion between a visual media data and a bitstream based on the modified video unit.
2. The method of solution 1, wherein video unit is modified before application of an encoding function of the video compression function or after application of a decoding function of the video compression function.
3. The method of any of solutions 1-2, wherein the video compression function comprises at least one neural network (NN) module.
4. The method of any of solutions 1-3, wherein modifying includes applying one or more geometric transformations to the video unit.
5. The method of any of solutions 1-4, wherein modifying includes applying a function as follows: $P'(x, y)=F(P(x, y))$ where $P(x, y)$ is the video unit, $F(\ )$ is an encoding modification function, and $P'(x, y)$ is the modified video unit.
6. The method of any of solutions 1-5, wherein modifying includes applying a function as follows: $P'(x, y)=G(P(x, y))$ where $P(x, y)$ is the video unit, $G(\ )$ is a decoding modification function, and $P'(x, y)$ is the modified video unit.
7. The method of any of solutions 1-6, wherein modifying includes vertically flipping the video unit according to: $P'(x, y)=P(x, H-1-y)$ where $P(x, y)$ is the video unit, H is a height of the video unit, and $P'(x, y)$ is the modified video unit.
8. The method of any of solutions 1-6, wherein modifying includes horizontally flipping the video unit according to: $P'(x, y)=P(W-1-x, y)$ where $P(x, y)$ is the video unit, W is a width of the video unit, and $P'(x, y)$ is the modified video unit.
9. The method of any of solutions 1-6, wherein modifying includes rotating the video unit 180 degrees according to: $P'(x, y)=P(W-1-x, H-1-y)$ where $P(x, y)$ is the video unit, W is a width of the video unit, H is a height of the video unit, and $P'(x, y)$ is the modified video unit.
10. The method of any of solutions 1-6, wherein modifying includes rotating the video unit 90 degrees according to: $P'(x, y)=P(H-y-1, x)$ where $P(x, y)$ is the video unit, H is a height of the video unit, and $P'(x, y)$ is the modified video unit.
11. The method of any of solutions 1-6, wherein modifying includes rotating the video unit 270 degrees according to: $P'(x, y)=P(y, x)$ where $P(x, y)$ is the video unit and $P'(x, y)$ is the modified video unit.
12. The method of any of solutions 1-11, wherein modifying includes modifying the video unit and samples of neighboring video units.
13. The method of any of solutions 1-12, wherein determining to modify is derived based on content in the video unit.
14. The method of any of solutions 1-12, wherein determining to modify is derived based on coding information related to the video unit.
15. The method of any of solutions 1-12, wherein determining to modify is derived based on syntax elements contained in the bitstream.
16 The method of any of solutions 1-12, wherein determining to modification function is derived based on syntax elements contained in the bitstream.
17. The method of any of solutions 1-12, wherein syntax elements related to modifying are included in a sequence header, picture header, a sequence parameter set (SPS), a video parameter set (VPS), a dependency parameter set (DPS), a decoding capability information (DCI), a picture parameter set (PPS), an adaptation parameter set (PPS), a slice header, a tile group header, or combinations thereof.
18. The method of any of solutions 1-12, determining to modify is derived based on block size, color format, single and/or dual tree partitioning, color component, slice type, picture type, or combinations thereof.
19. The method of any of solutions 1-18, wherein the video compression function performs the conversion based on the modified video unit, and wherein the video compression function employs neural network (NN)-based inter prediction, NN-based intra prediction, NN-based super-resolution, NN-based motion compensation, NN-based reference generation, NN-based fractional pixel interpolation, NN-based in-loop filtering, NN-based post loop filtering, or combinations thereof.
20. An apparatus for processing video data comprising: a processor; and a non-transitory memory with instructions thereon, wherein the instructions upon execution by the processor, cause the processor to perform the method of any of solutions 1-19.
21. A non-transitory computer readable medium comprising a computer program product for use by a video coding device, the computer program product comprising computer executable instructions stored on the non-transitory computer readable medium such that when executed by a processor cause the video coding device to perform the method of any of solutions 1-19.
22. A non-transitory computer-readable recording medium storing a bitstream of a video which is generated by a method performed by a video processing apparatus, wherein the method comprises: determine to modify a video unit attendant to applying a video compression function; and generating the bitstream based on the determining.

23. A method for storing bitstream of a video comprising: determine to modify a video unit attendant to applying a video compression function; generating the bitstream based on the determining; and storing the bitstream in a non-transitory computer-readable recording medium.

24. A method, apparatus, or system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and digital versatile disc-read only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of particular techniques. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing video data, comprising:

determining, for a conversion between a current video block of a video and a bitstream of the video, to modify a video unit which is associated with a processing module; and performing the conversion based on the determining;

wherein the video unit comprises at least one of a first video unit and a second video unit;

wherein the first video unit is modified in a first way before the first video unit is input into the processing module;

wherein the second video unit from the processing module is modified in a second way before the second video unit is used as a final output or a reference picture; and wherein at least one of the first video unit and the second video unit is modified by using one or more geometric transforms, and wherein the one or more geometric transforms comprise reflection, rotation, or flipping.

2. The method of claim 1, wherein the processing module comprises an in-loop processing module or a post-processing module; and the in-loop processing module or the post-processing module comprises at least one neural network (NN) model.

3. The method of claim 1, wherein the first video unit is modified by applying a function as follows: $P1'(x_1, y_1)=F(P1(x_1, y_1))$, where $P1(x_1, y_1)$ represents the first video unit, $x_1$ and $y_1$ represents horizontal and vertical coordinates of samples in the first video unit, F( ) is a function that is capable of being applied to modify the first video unit, and $P1'(x_1, y_1)$ is a modified first video unit;

the second video unit is modified by applying a function as follows: $P2'(x_2, y_2)=G(P2(x_2, y_2))$, where $P2(x_2, y_2)$ represents the second video unit, $x_2$ and $y_2$ represents horizontal and vertical coordinates of samples in the second video unit, G( ) is a function that is capable of being applied to modify the second video unit, and $P2'(x_2, y_2)$ is a modified second video unit;

F( ) and G( ) comprise flipping and/or rotation; and in response to the first video unit being a picture, G( ) is an anti-operation of F( ).

4. The method of claim 1, wherein the video unit is modified by using vertical flip, and the vertical flip is defined as follows: $P'(x, y)=P(x, H-1-y)$, where P(x, y) represents the video unit, x and y represents horizontal and vertical coordinates of samples in the video unit, H is a height of the video unit, and P'(x, y) represents a modified video unit; or wherein the video unit is modified by using horizontal flip, and the horizontal flip is defined as follows: $P'(x, y)=P(W-1-x, y)$, where P(x, y) represents the video unit, x and y represents the horizontal and vertical coordinates of the samples in the video unit, W is a width of the video unit, and P'(x, y) represents the modified video unit.

5. The method of claim 1, wherein the video unit is modified by rotating 180 degrees according to: $P'(x, y)=P(W-1-x, H-1-y)$, where P(x, y) represents the video unit, x and y represents horizontal and vertical coordinates of samples in the video unit, W is a width of the video unit, H is a height of the video unit, and P'(x, y) represents a modified video unit; or wherein the video unit is modified by rotating clockwise 90 degrees according to: $P'(x, y)=P(H-y-1, x)$, where P(x, y) represents the video unit, x and y represents the horizontal and vertical coordinates of the samples in the video unit, His the height of the video unit, and P'(x, y) represents the modified video unit; or wherein the video unit is modified by rotating clockwise 270 degrees according to: $P'(x, y)=P(y, x)$, where P(x, y) represents the video unit, x and y represents the horizontal and vertical coordinates of the samples in the video unit, and P'(x, y) represents the modified video unit.

6. The method of claim 2, wherein input of the NN model comprises samples from a current video unit and neighbouring video units, and the current video unit and the neighbouring video units are all modified before inputting into the NN model; and wherein modification for the current video unit and the neighbouring video units comprises flipping or rotation.

7. The method of claim 1, wherein padding samples and existing samples of the video unit are all modified; or the padding samples are padded after modification is performed on the existing samples.

8. The method of claim 2, wherein an application manner of a geometric transform type on input and/or output of the NN model is derived on-the-fly; or the application manner of the geometric transform type on input and/or output of the NN model is derived based on content of the video unit; or the application manner of the geometric transform type on input and/or output of the NN model depends on coding information, wherein the coding information comprises picture type, slice type, temporal layer, quantization parameter (QP), color format, color component, coding mode, or dimensions of the video unit.

9. The method of claim 8, wherein a geometric transform is only applied to NN models of inter slice; or the geometric transform is only applied to NN models of luma component.

10. The method of claim 2, wherein at least one syntax element indicating an application manner of a geometric transform type on input and/or output of the NN model is included in the bitstream;

the at least one syntax element is included in a sequence parameter set (SPS), a picture parameter set (PPS), an adaptation parameter set (APS), a picture header, a slice header, a coding tree unit (CTU), or a coding unit (CU); and the at least one syntax element is coded using fixed length coding, exponential Golomb (EG) coding, truncated (unary) coding, or at least one context in arithmetic coding, or the at least one syntax element is bypass coded.

11. The method of claim 10, wherein the at least one syntax element comprises a first syntax element and/or a second syntax element;

the first syntax element indicates whether a geometric transform is applied or not;

the second syntax element indicates which geometric transform is applied; and the second syntax element is included in the bitstream only if the first syntax element indicates that the geometric transform is applied.

12. The method of claim 10, wherein the at least one syntax element is included in the bitstream only if modification to the video unit is allowed.

13. The method of claim 1, wherein processing modules are different for different modifications on the video unit, and the processing modules are different depending on whether a modification is applied on the video unit; or the processing modules are same for different modifications on the video unit, and the processing modules are same regardless of the modification being applied on the video unit.

14. The method of claim 2, wherein variables related to the determining and conversion are included in a sequence header, a picture header, a sequence parameter set (SPS), a video parameter set (VPS), a dependency parameter set (DPS), a decoding capability information (DCI), a picture parameter set (PPS), an adaptation parameter set (APS), a slice header, or a tile group header;

the variables related to the determining and conversion are dependent on block size, colour format, single tree partitioning, dual tree partitioning, colour component, slice type, or picture type; and the NN model is used to perform NN-based inter prediction, NN-based intra prediction, NN-based super-resolution, NN-based motion compensation, NN-based reference generation, NN-based fractional pixel interpolation, NN-based in-loop filtering, or NN-based post filtering.

15. The method of claim 1, wherein the conversion includes encoding the current video block into the bitstream.

16. The method of claim 1, wherein the conversion includes decoding the current video block from the bitstream.

17. An apparatus for processing video data comprising a processor and a non-transitory memory with instructions thereon, wherein the instructions upon execution by the processor, cause the processor to:

determine, for a conversion between a current video block of a video and a bitstream of the video, to modify a video unit which is associated with a processing module; and perform the conversion based on the determining;

wherein the video unit comprises at least one of a first video unit and a second video unit;

wherein the first video unit is modified in a first way before the first video unit is input into the processing module;

wherein the second video unit from the processing module is modified in a second way before the second video unit is used as final output or a reference picture; and wherein at least one of the first video unit and the second video unit is modified by using one or more geometric transforms, and wherein the one or more geometric transforms comprise reflection, rotation, or flipping.

18. A non-transitory computer-readable storage medium storing instructions that cause a processor to:

determine, for a conversion between a current video block of a video and a bitstream of the video, to modify a video unit which is associated with a processing module; and perform the conversion based on the determining;

wherein the video unit comprises at least one of a first video unit and a second video unit;

wherein the first video unit is modified in a first way before the first video unit is input into the processing module;

wherein the second video unit from the processing module is modified in a second way before the second video unit is used as final output or a reference picture; and wherein at least one of the first video unit and the second video unit is modified by using one or more geometric transforms, and wherein the one or more geometric transforms comprise reflection, rotation, or flipping.

19. A method for storing a bitstream of a video, comprising:

determining, for a current video block of the video, to modify a video unit which is associated with a processing module;

generating the bitstream based on the determining; and storing the bitstream in a non-transitory computer-readable recording medium;

wherein the video unit comprises at least one of a first video unit and a second video unit;

wherein the first video unit is modified in a first way before the first video unit is input into the processing module;

wherein the second video unit from the processing module is modified in a second way before the second video unit is used as final output or a reference picture; and wherein at least one of the first video unit and the second video unit is modified by using one or more geometric transforms, and wherein the one or more geometric transforms comprise reflection, rotation, or flipping.

* * * * *